US012117089B2

(12) United States Patent
Hamada et al.

(10) Patent No.: US 12,117,089 B2
(45) Date of Patent: Oct. 15, 2024

(54) VALVE DEVICE

(71) Applicant: DENSO CORPORATION, Kariya (JP)

(72) Inventors: Takuya Hamada, Kariya (JP); Ryo Sano, Kariya (JP); Atsushi Tanaka, Kariya (JP); Akira Higuchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 36 days.

(21) Appl. No.: 18/190,565

(22) Filed: Mar. 27, 2023

(65) Prior Publication Data
US 2023/0228333 A1 Jul. 20, 2023

Related U.S. Application Data

(63) Continuation of application No. PCT/JP2021/033319, filed on Sep. 10, 2021.

(30) Foreign Application Priority Data

Sep. 29, 2020 (JP) ................................ 2020-163936

(51) Int. Cl.
*F16K 11/074* (2006.01)
*F16K 3/02* (2006.01)
(Continued)

(52) U.S. Cl.
CPC ............. *F16K 3/0254* (2013.01); *F16K 3/34* (2013.01); *F16K 11/074* (2013.01); *F16K 31/043* (2013.01); *F16K 3/08* (2013.01)

(58) Field of Classification Search
CPC .. F16K 11/074; F16K 2200/30; F16K 31/043; F16K 3/0254; F16K 3/34; F16K 3/08
See application file for complete search history.

(56) References Cited

U.S. PATENT DOCUMENTS 283,788 A * 8/1883 Johnson ..................... F16K 3/08
251/180
293,240 A * 2/1884 Goldsmith ................ F16K 3/08
251/185
(Continued)

FOREIGN PATENT DOCUMENTS

JP 2002/257248 9/2002

OTHER PUBLICATIONS

U.S. Appl. No. 18/190,514 to Ryo Sano et al., filed Mar. 27, 2023 (48 pages).
(Continued)

*Primary Examiner* — Umashankar Venkatesan
(74) *Attorney, Agent, or Firm* — Nixon & Vanderhye P.C.

(57) ABSTRACT

A valve device includes a housing, a stationary disk, a drive device, a shaft and a rotor. The stationary disk is fixed at an inside of the housing and has at least one flow passage hole. The shaft is rotated about a central axis by the drive device. The rotor increases or decreases an opening degree of the at least one flow passage hole. The rotor includes: a drive disk that slides relative to the stationary disk; and a lever that is fixed to the drive disk and couples between the drive disk and the shaft. A torsion spring is placed between the shaft and the lever and urges the lever relative to the shaft in a circumferential direction around the central axis of the shaft. The shaft has a plurality of contact portions configured to contact the lever and respectively located at a plurality of locations.

4 Claims, 17 Drawing Sheets

(51) Int. Cl.
    *F16K 3/34*         (2006.01)
    *F16K 31/04*      (2006.01)
    *F16K 3/08*         (2006.01)

(56) References Cited

U.S. PATENT DOCUMENTS

| | | | | |
|---|---|---|---|---|
| 1,315,741 | A * | 9/1919 | Pranold | F16K 5/08 |
| | | | | 137/625.3 |
| 1,911,044 | A * | 5/1933 | Thrasher | F16K 3/34 |
| | | | | 251/185 |
| 3,934,612 | A * | 1/1976 | Kast | F16K 3/32 |
| | | | | 137/625.3 |
| 5,219,148 | A * | 6/1993 | Weyand | F16K 3/08 |
| | | | | 251/192 |
| 11,248,714 | B2 * | 2/2022 | Higuchi | F16K 31/043 |
| 2022/0196157 | A1 * | 6/2022 | Mizunuma | F16K 31/041 |

OTHER PUBLICATIONS

U.S. Appl. No. 18/469,004 to Atsushi Tanaka, filed Sep. 18, 2023 (63 pages).
U.S. Appl. No. 18/468,073 to Yoshitada Aono, filed Sep. 18, 2023 (63 pages).
U.S. Appl. No. 18/468,291 to Ryo Sano, filed Sep. 18, 2023 (54 pages).
U.S. Appl. No. 18/468,925 to Shota Kimura, filed Sep. 18, 2023 (59 pages).
U.S. Appl. No. 18/469,283 to Naoki Asano, filed Sep. 18, 2023 (50 pages).
U.S. Appl. No. 18/468,972 to Takyua Hamada, filed Sep. 18, 2023 (53 pages).
U.S. Appl. No. 18/469,218 to Takehito Mizunuma, filed Sep. 18, 2023 (61 pages).

* cited by examiner

VALVE DEVICE

CROSS REFERENCE TO RELATED APPLICATIONS

This application is a continuation application of International Patent Application No. PCT/JP2021/033319 filed on Sep. 10, 2021, which designated the U.S. and claims the benefit of priority from Japanese Patent Application No. 2020-163936 filed on Sep. 29, 2020. The entire disclosures of all of the above applications are incorporated herein by reference.

TECHNICAL FIELD

The present disclosure relates to a valve device.

BACKGROUND

A flow rate control valve is an example of a valve device. For example, one previously proposed flow rate control valve includes: a valve element; a drive device which drives the valve element; a speed reducer which is placed between the valve element and the drive device and increases a drive torque outputted from the drive device; and a return spring which urges the valve element that is driven through the speed reducer. The valve element of this flow rate control valve includes a shaft and a disk (serving as a rotor). The disk and the shaft are configured to rotate integrally in a state where the disk is displaceable in an axial direction of the shaft. Specifically, the shaft (known as a D-cut shaft), which has a D-shaped outer shape, is loosely fitted into a D-shaped through-hole formed at a center of the disk.

SUMMARY

This section provides a general summary of the disclosure, and is not a comprehensive disclosure of its full scope or all of its features.

According to the present disclosure, there is provided a valve device that includes a housing, a stationary disk, a drive device, a shaft and a rotor. The housing forms a fluid passage to conduct fluid at an inside of the housing. The stationary disk is fixed at the inside of the housing and has at least one flow passage hole. The drive device is configured to output a rotational force. The shaft is configured to be rotated about a central axis by the rotational force. The rotor is configured to increase or decrease an opening degree of the at least one flow passage hole in response to rotation of the shaft. The rotor includes a drive disk and a lever. The drive disk is configured to slide relative to the stationary disk. The lever is fixed to the drive disk and couples between the drive disk and the shaft to enable integral rotation of the drive disk and the shaft. A torsion spring is placed between the shaft and the lever and is configured to urge the lever relative to the shaft in a circumferential direction around the central axis of the shaft. The shaft has a plurality of contact portions that are configured to contact the lever and are respectively located at a plurality of locations which are displaced from each other in the circumferential direction.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
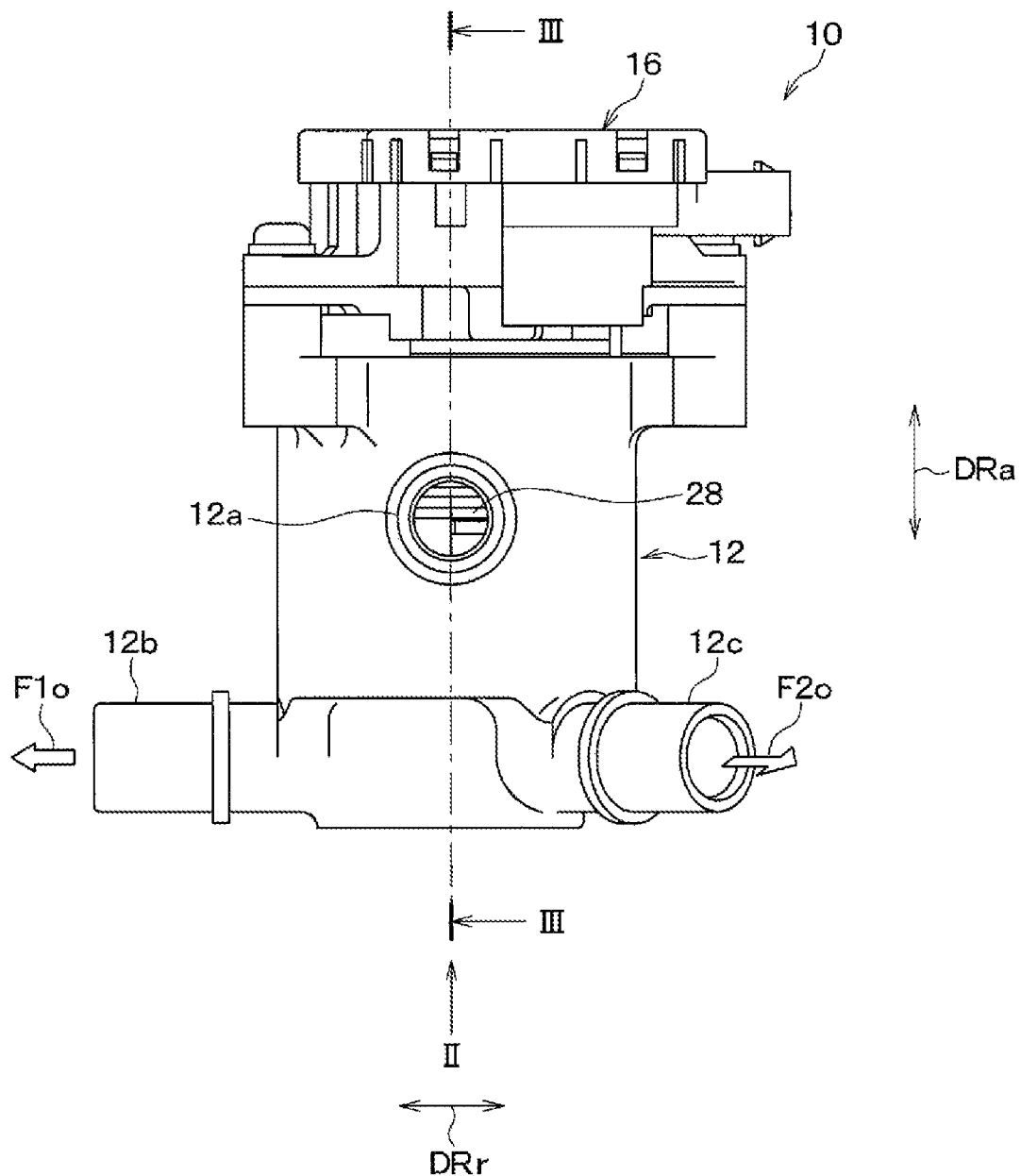
FIG. 1 is a front view of a valve device according to an embodiment.

A flow rate control valve is an example of a valve device. For example, one previously proposed flow rate control valve includes: a valve element; a drive device which drives the valve element; a speed reducer which is placed between the valve element and the drive device and increases a drive torque outputted from the drive device; and a return spring which urges the valve element that is driven through the speed reducer. The valve element of this flow rate control valve includes a shaft and a disk (serving as a rotor). The disk and the shaft are configured to rotate integrally in a state where the disk is displaceable in an axial direction of the shaft. Specifically, the shaft (known as a D-cut shaft), which has a D-shaped outer shape, is loosely fitted into a D-shaped through-hole formed at a center of the disk.

In the flow rate control valve described above, when the disk, which is the rotor, is rotated by the drive device, an opening degree of a flow passage hole, through which the fluid flows from an inlet to an outlet of a valve housing, is increased or decreased.

However, in the flow rate control valve described above, although a gap is present between the disk and the shaft, no countermeasures are taken to limit rattling in the circumferential direction between the disk and the shaft, so that variations occur in the opening degree of the flow passage hole. The variations in the opening degree of the flow passage hole will cause variations in the flow rate of the fluid, which flows through the valve device, so that the variations in the opening degree of the flow passage hole are not desirable. The above finding is made thorough the diligent study of the inventors of the present application.

In view of the above point, the inventors have tried to limit the rattling in the circumferential direction between the disk and the shaft by placing a torsion spring between the shaft and the disk.

However, in the case where the disk and the shaft are coupled together by fitting the D-cut shaft into the through-hole of the disk, the disk and the shaft may contact with each other at a single location that is spaced away from the center of the shaft, and thereby a torque from the torsion spring concentrates on this location. In this case, the contact portion between the disk and the shaft tends to wear out.

According to one aspect of the present disclosure, there is provided a valve device including:
  a housing that forms a fluid passage at an inside of the housing, wherein the fluid passage is configured to conduct fluid through the housing;
  a stationary disk that is shaped in a plate form and is fixed at the inside of the housing, wherein the stationary disk has at least one flow passage hole which is configured to conduct the fluid through the stationary disk;
  a drive device that is configured to output a rotational force;
  a shaft that is configured to be rotated about a central axis, which is predetermined, by the rotational force; and
  a rotor that is configured to increase or decrease an opening degree of the at least one flow passage hole in response to rotation of the shaft, wherein:
  the rotor includes:
    a drive disk that is shaped in a plate form and is configured to slide relative to the stationary disk; and
    a lever that is fixed to the drive disk and couples between the drive disk and the shaft to enable integral rotation of the drive disk and the shaft in a state where the drive disk is displaceable in an axial direction of the shaft;
  a torsion spring is placed between the shaft and the lever and is configured to urge the lever relative to the shaft in a circumferential direction around the central axis of the shaft; and
  the shaft has a plurality of contact portions that are configured to contact the lever and are respectively located at a plurality of locations which are displaced from each other in the circumferential direction.

As long as the torsion spring urges the lever relative to the shaft in the circumferential direction around the central axis of the shaft as discussed above, the rattling in the circumferential direction between the shaft and the lever is limited. Since the lever is fixed to the drive disk, the torsion spring limits the rattling in the circumferential direction between the shaft and the lever.

Furthermore, since the shaft and the lever come into contact with each other through the plurality of contact portions respectively located at the plurality of locations, the torque from the torsion spring is dispersed at the plurality of locations. Therefore, wearing at the respective contact portions of the shaft and the lever, which are configured to contact with each other, is limited.

Therefore, the valve device of the present disclosure can limit the wearing of the rotor while limiting the rattling in the circumferential direction between the rotor and the shaft.

Hereinafter, an embodiment of the present disclosure will be described with reference to FIGS. 1 to 23. In the present embodiment, there will be described an example in which a valve device 10 of the present disclosure is applied as a control valve installed on a vehicle. The valve device 10 shown in FIG. 1 is installed in a fluid circulation circuit (not shown) in which fluid (coolant in this example) is circulated through a vehicle drive power source for running the vehicle, a radiator and the like, and the fluid, which is circulated in the fluid circulation circuit, flows through the valve device 10.

The valve device 10 can increase or decrease a flow rate of the fluid in a flow path that extends through the valve device 10 in the fluid circulation circuit, and the valve device 10 can also shut off the flow of the fluid in the flow path. For example, LLC, which contains ethylene glycol, may be used as the fluid. Here, LLC is an abbreviation for Long Life Coolant.

Figure 2:
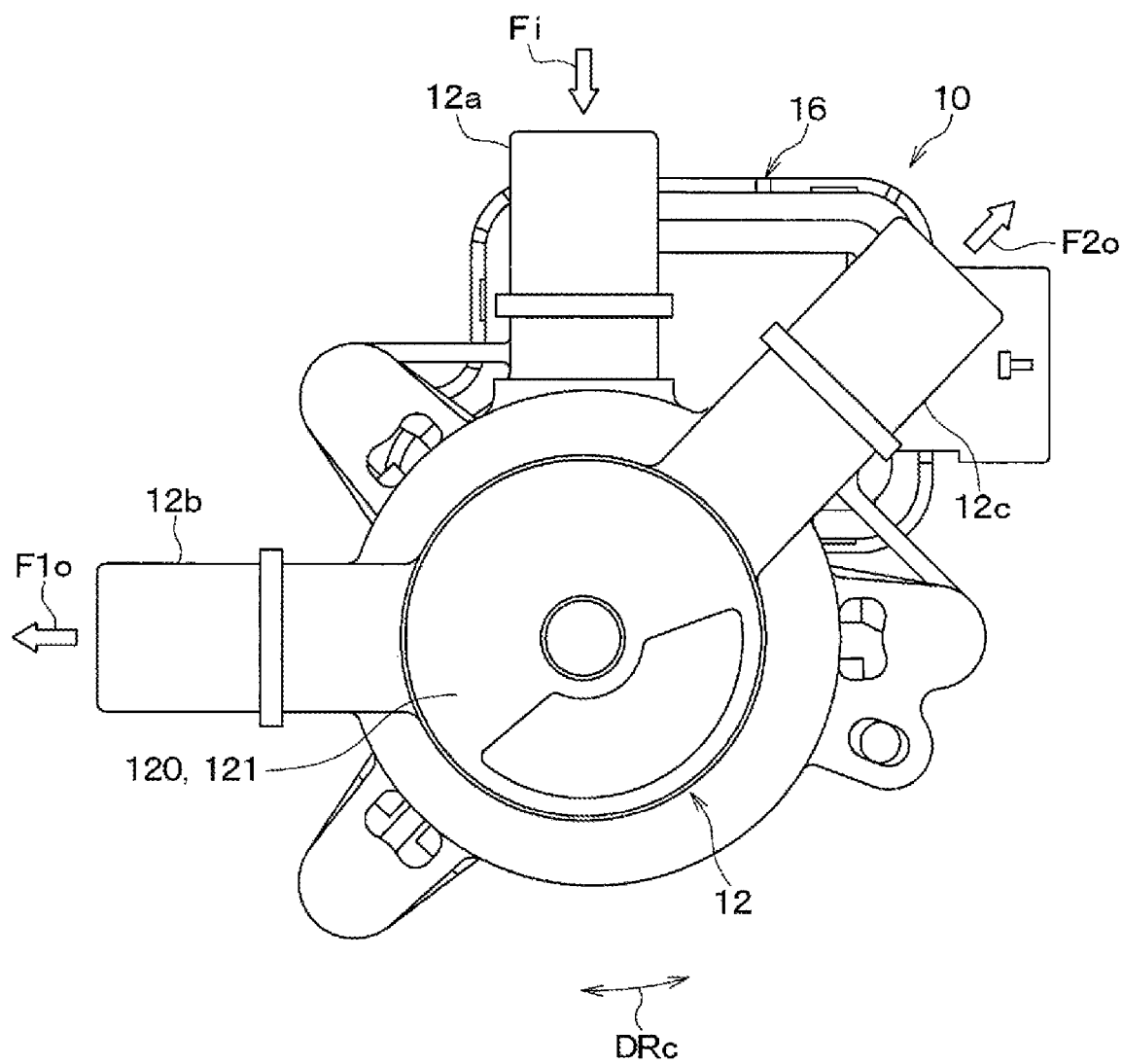
FIG. 2 is a bottom view of the valve device viewed in a direction of an arrow II in FIG. 1.

As shown in FIGS. 1 and 2, the valve device 10 includes a housing 12 that forms a fluid passage at an inside of the housing 12 while the fluid passage is configured to conduct fluid through the housing 12. The valve device 10 is a three-way valve and is formed such that an inlet port 12a for receiving the fluid, a first outlet port 12b for outputting the fluid, and a second outlet port 12c for outputting the fluid are formed at the housing 12. The valve device 10 functions not only as a flow path switching valve but also functions as a flow rate adjusting valve that adjusts a flow rate ratio between a flow rate of the fluid, which flows from the inlet port 12a to the first outlet port 12b, and a flow rate of the fluid, which flows from the inlet port 12a to the second outlet port 12c.

The valve device 10 is a disk valve that performs a valve opening/closing operation by rotating a valve element shaped in a circular disk form about a central axis CL of a shaft 18 described later. In the present embodiment, description of various structures will be made while assuming that a direction, which is along the central axis CL of the shaft 18 described later, is an axial direction DRa, and a radial direction of the central axis CL, which is perpendicular to the axial direction DRa, is a radial direction DRr. Also, in the present embodiment, the description of the various structures will be made while assuming that a circumferential direction around the central axis CL is a circumferential direction DRc.

Figure 3:
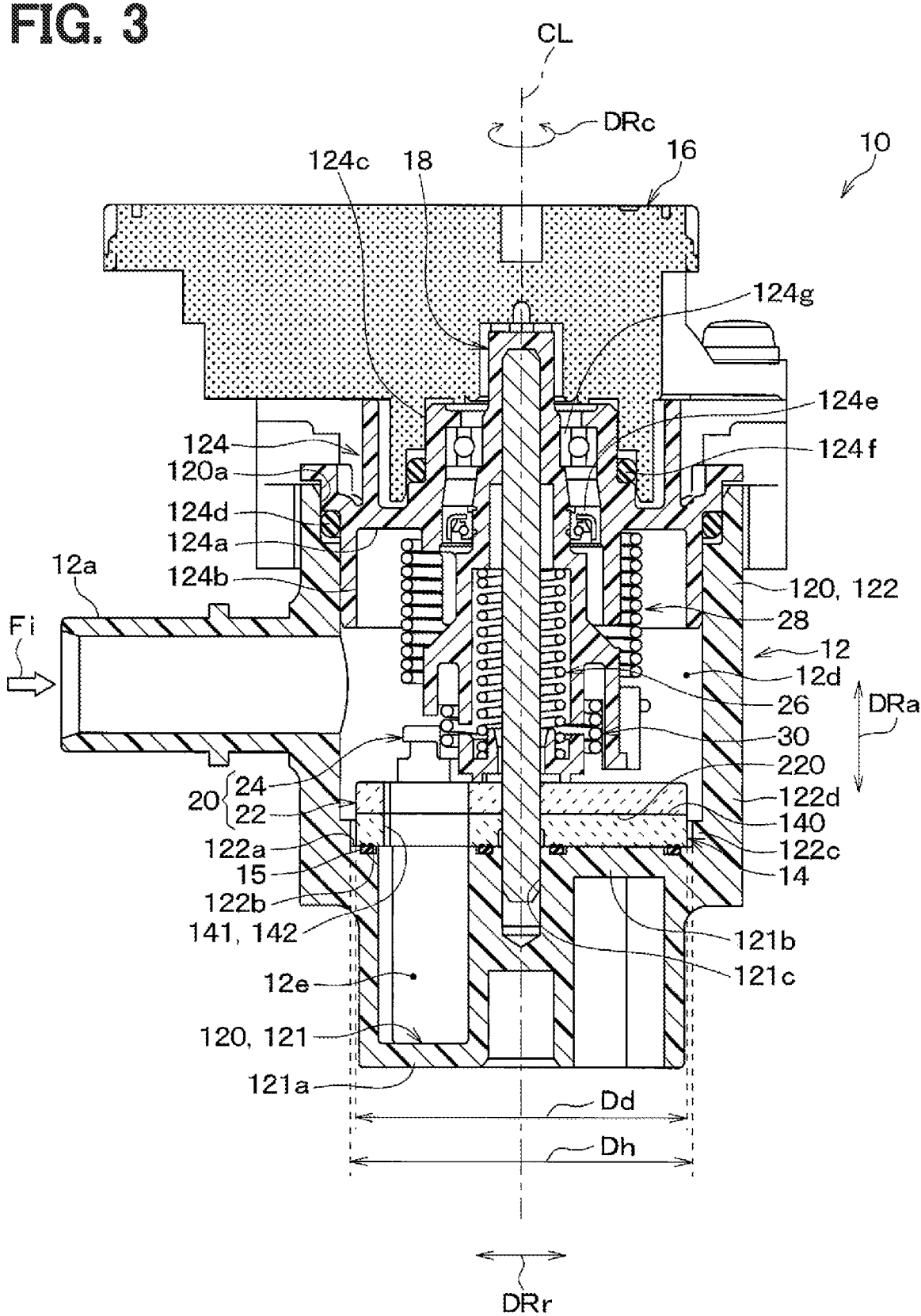
FIG. 3 is a cross-sectional view taken along line III-III in FIG. 1.

As shown in FIG. 3, in the valve device 10, a stationary disk 14, a drive device 16, the shaft 18, a rotor 20, a compression spring 26, a first torsion spring 28 and a second torsion spring 30 are received at the inside of the housing 12. Furthermore, in the valve device 10, the drive device 16 is placed at an outside of the housing 12.

The housing 12 is a non-rotatable member that does not rotate. The housing 12 is made of, for example, a resin material. The housing 12 has: a main body 120, which is shaped in a bottomed tubular form and extends in the axial direction DRa; and a main body cover 124 which closes an opening 120a of the main body 120.

The main body 120 has: a bottom wall 121 which forms a bottom surface; and a peripheral wall 122, which circumferentially surrounds the central axis CL. The bottom wall 121 and the peripheral wall 122 are formed integrally in one-piece as an integral molded product.

Two stepped portions (recesses), which correspond to two flow passage holes 141, 142, respectively, of the stationary disk 14 described later, are formed at the bottom wall 121. That is, each of two portions of the bottom wall 121, which are opposed to the flow passage holes 141, 142, respectively, of the stationary disk 14, is further spaced from the main body cover 124 than a portion of the bottom wall 121, which is not opposed to the flow passage holes 141, 142 of the stationary disk 14.

The bottom wall 121 has: two opposing portions 121a, which are opposed to the flow passage holes 141, 142, respectively, of the stationary disk 14; and a non-opposing portion 121b, which is not opposed to each of the flow passage holes 141, 142 of the stationary disk 14. The opposing portions 121a of the bottom wall 121 are largely spaced from the stationary disk 14, and the non-opposing portion 121b of the bottom wall 121 is adjacent to the stationary disk 14.

The peripheral wall 122 has the inlet port 12a at a location that is closer to the opening 120a than to the bottom wall 121. The peripheral wall 122 also has the first outlet port 12b and the second outlet port 12c at a location that is closer to the bottom wall 121 than to the opening 120a. Each of the inlet port 12a, the first outlet port 12b and the second outlet port 12c is a tubular member that has a flow passage therein.

A mounting portion 122a, on which the stationary disk 14 is placed, is formed at the inside of the peripheral wall 122 at a location between the portion of the peripheral wall 122, at which the inlet port 12a is formed, and the portion of the peripheral wall 122, at which the outlet ports 12b, 12c are formed. The mounting portion 122a is a portion that contacts a back surface of the stationary disk 14 which is opposite to an opening surface 140 of the stationary disk 14. The mounting portion 122a is formed at the portion of the peripheral wall 122 where an inner diameter of the peripheral wall 122 changes. Specifically, the mounting portion 122a is a flat portion that extends in the radial direction DRr. A receiving groove 122b, which receives a gasket 15, is formed at the mounting portion 122a.

Furthermore, the peripheral wall 122 has a first disk opposing portion 122c, which is opposed to the stationary disk 14 in the radial direction DRr, and a second disk opposing portion 122d, which is opposed to the drive disk 22 in the radial direction DRr.

Figure 4:
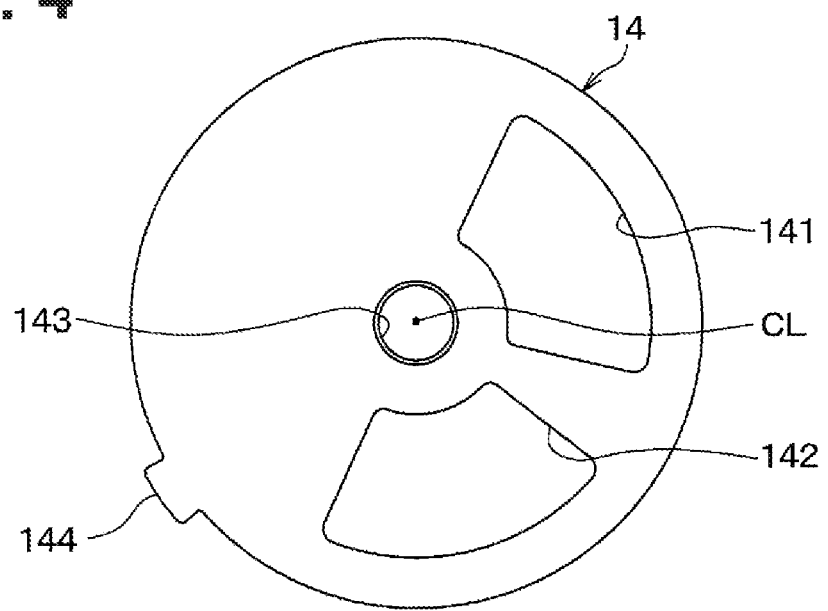
FIG. 4 is a bottom view of a stationary disk.

The first disk opposing portion 122c has a receiving groove (not shown) that receives a rotation stop projection 144 of the stationary disk 14 shown in FIG. 4. The rotation of the stationary disk 14 may be stopped by, for example, a rotation stop pin instead of the rotation stop projection 144.

An inner diameter Dh of the first disk opposing portion 122c is larger than an outer diameter Dd of a remaining portion of the stationary disk 14, which is other than the rotation stop projection 144. Thereby, a gap is formed between the stationary disk 14 and the peripheral wall 122 in a state where the stationary disk 14 is placed on the mounting portion 122a. In other words, the stationary disk 14 is not positioned by the peripheral wall 122.

An inner diameter of the second disk opposing portion 122d is larger than the inner diameter of the first disk opposing portion 122c. The inner diameter of the second disk opposing portion 122d is larger than an outer diameter of the drive disk 22. Thereby, a gap is formed between the drive disk 22 and the peripheral wall 122. That is, the drive disk 22 does not contact the peripheral wall 122 and is not positioned by the peripheral wall 122. The outer diameter of the drive disk 22 is substantially the same as an outer diameter Dd of the stationary disk 14.

The inside of the housing 12 is partitioned by the stationary disk 14 into an inlet-side space 12d and an outlet-side space 12e. The inlet-side space 12d is a space that is communicated with the inlet port 12a at the inside of the housing 12. The outlet-side space 12e is a space that is communicated with the first outlet port 12b and the second outlet port 12c at the inside of the housing 12.

Although not shown in the drawing, a partition portion is formed at the inside of the main body 120. The partition portion partitions the outlet-side space 12e into a first outlet-side space, which is communicated with the first flow passage hole 141, and a second outlet-side space, which is communicated with the second flow passage hole 142. This partition portion is formed to extend across the outlet-side space 12e in the radial direction DRr.

The main body cover 124 is a lid member that covers the opening 120a of the main body 120. The main body cover 124 has a plate portion 124a, a rib portion 124b and a boss portion 124c. The plate portion 124a, the rib portion 124b and the boss portion 124c are formed integrally in one-piece as an integral molded product.

The plate portion 124a is a portion that is shaped in a circular ring form which extends in the radial direction DRr. In the main body cover 124, the plate portion 124a forms the inlet-side space 12d in corporation with the peripheral wall 122 and the stationary disk 14.

The rib portion 124b is a portion of the main body cover 124 that is fitted into the opening 120a of the main body 120. The rib portion 124b is shaped in a tubular form and is placed on a radially outer side of the plate portion 124a. The rib portion 124b is formed to project from the plate portion 124a toward the bottom wall 121. An O-ring 124d, which seals a gap between the main body 120 and the main body cover 124, is placed between the rib portion 124b and the peripheral wall 122.

The boss portion 124c is a portion through which the shaft 18 is inserted. The boss portion 124c is shaped in a tubular form and is placed on a radially inner side of the plate portion 124a. The boss portion 124c is provided with: a shaft seal 124e, which is placed at the inside of the boss portion 124c; and an O-ring 124f, which is placed at the outside of the boss portion 124c. The shaft seal 124e is shaped in a circular ring form and seals between the shaft 18 and the boss portion 124c, and the O-ring 124f seals a gap between the boss portion 124c and the drive device 16. Furthermore, a bearing 124g, which rotatably supports the shaft 18, is placed at the inside of the boss portion 124c.

The stationary disk 14 is a circular disk member while a thickness direction of the stationary disk 14 coincides with the axial direction DRa. The stationary disk 14 has the opening surface 140 as a front surface of the stationary disk 14 along which the drive disk 22 described later slides. The opening surface 140 is a contact portion that contacts a sliding surface 220 of the drive disk 22 which will be described later.

It is desirable that the stationary disk 14 is made of a material that has a smaller linear expansion coefficient and superior wear resistance than the material of the housing 12. The material of the stationary disk 14 is a high-hardness material that is harder than the material of the housing 12. Specifically, the stationary disk 14 is made of ceramic. Alternatively, the stationary disk 14 may be formed such that only a portion of the stationary disk 14, which forms the opening surface 140, is made of the material, such as the ceramic, which has the smaller linear expansion coefficient and the superior wear resistance than the material of the housing 12.

In addition, the stationary disk 14 serves as a flow passage forming portion that has the flow passage holes 141, 142 through each of which the fluid passes. Therefore, in the valve device 10 of the present embodiment, the stationary disk 14, which serves as the flow passage forming portion, is formed as a separate member that is formed separately from the housing 12.

As shown in FIG. 4, the stationary disk 14 has the first flow passage hole 141 and the second flow passage hole 142 through each of which the fluid passes. The first flow passage hole 141 and the second flow passage hole 142 are formed in the stationary disk 14 at a location, which is spaced from the central axis CL of the shaft 18, such that the first flow passage hole 141 and the second flow passage hole 142 do not overlap with the central axis CL of the shaft 18. Each of the first flow passage hole 141 and the second flow passage hole 142 is a through-hole that is shaped in a sector shape (i.e., fan shape), and each of the first flow passage hole 141 and the second flow passage hole 142 functions as a communication passage that communicates between the inlet-side space 12d and the outlet-side space 12e. Here, it should be noted that the first flow passage hole 141 and the second flow passage hole 142 may be formed in any other shape such as a circular shape or an elliptical shape.

Specifically, the first flow passage hole 141 is formed at a portion of the stationary disk 14, which corresponds to the first outlet-side space, such that the first flow passage hole 141 is communicated with the first outlet-side space. Furthermore, the second flow passage hole 142 is formed at a portion of the stationary disk 14, which corresponds to the second outlet-side space, such that the second flow passage hole 142 is communicated with the second outlet-side space.

A stationary disk hole 143, through which the shaft 18 is inserted, is formed generally at the center of the stationary disk 14. The stationary disk hole 143 has an inner diameter that is larger than a diameter of the shaft 18 so as to limit sliding of the shaft 18 along the stationary disk hole 143.

The gasket 15, which seals a gap between the stationary disk 14 and the mounting portion 122a, is placed between the stationary disk 14 and the mounting portion 122a. The gasket 15 is made of rubber. The gasket 15 is received in the receiving groove 122b which is formed at the mounting portion 122a.

The drive device 16 shown in FIGS. 1 and 3 is a device for outputting a rotational force. Although not shown in the drawing, the drive device 16 includes an electric motor and a gear arrangement. The electric motor serves as a drive source, and the gear arrangement serves as a drive force transmitting member that transmits an output of the electric motor to the shaft 18. For example, a servomotor or a brushless motor is used as the electric motor in this embodiment. The gear arrangement is formed by a gear mechanism that includes a helical gear or a spur gear. Although not shown in the drawing, the electric motor is rotated according to a control signal outputted from a valve control device that is electrically connected to the electric motor. The valve control device is a computer that includes: a memory, which is a non-transitory tangible storage medium; and a processor. The valve control device executes a computer program stored in the memory and performs various control processes according to the computer program.

Figure 5:
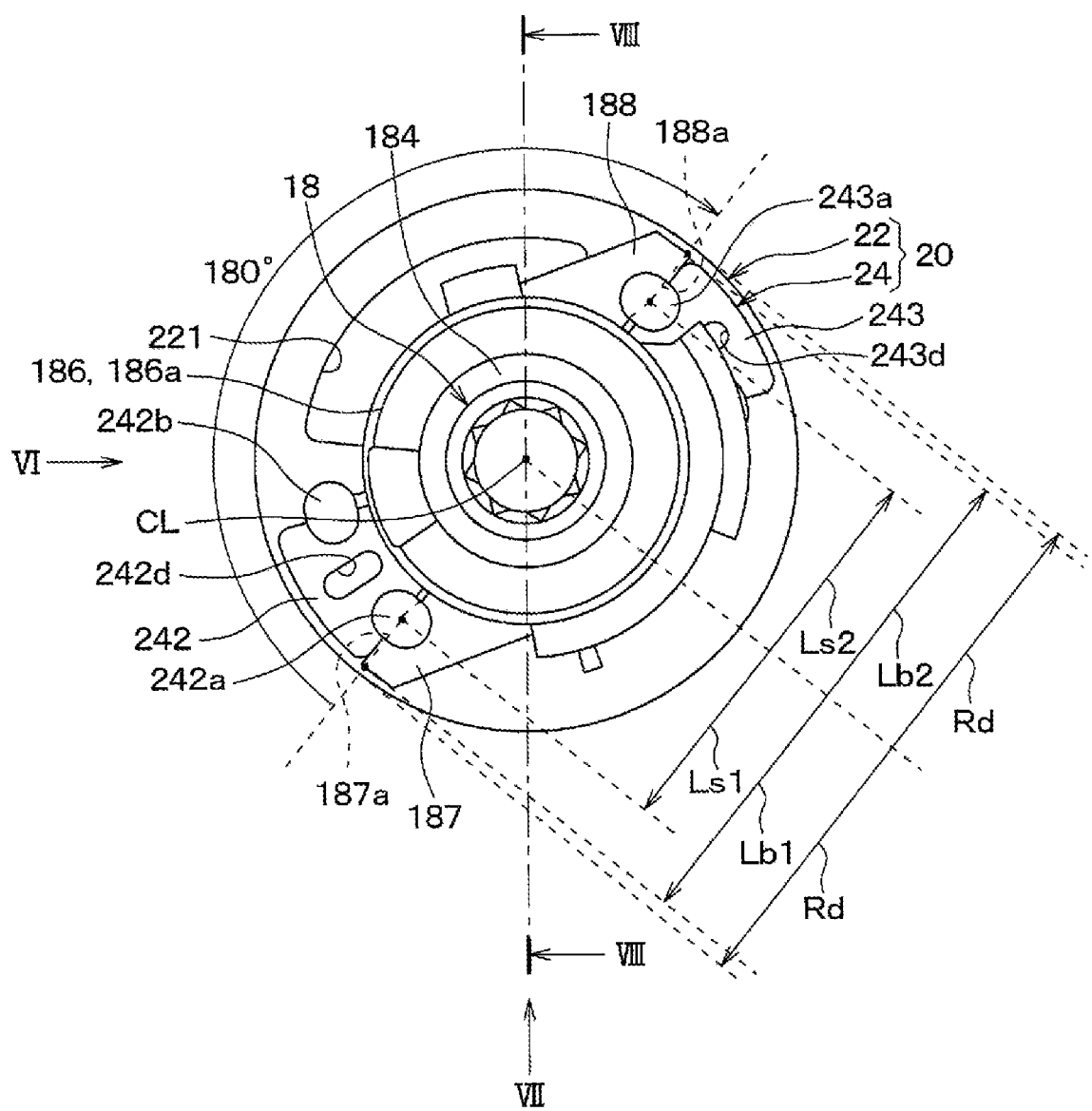
FIG. 5 is a plan view of an assembly of a shaft, a rotor and a lever.

As shown in FIGS. 3 and 5, the shaft 18 is a rotatable shaft that is rotated about the central axis CL, which is predetermined, by the rotational force transmitted from the drive device 16 through a transmission path. The shaft 18 extends in the axial direction DRa. Two axial sides of the shaft 18, which are opposite to each other in the axial direction DRa, are rotatably supported by the housing 12. That is, the shaft 18 has a double end support structure. The shaft 18 extends through the stationary disk 14 and the drive disk 22 and is rotatably supported by the housing 12. Specifically, the one axial side of the shaft 18, which is located on one side in the axial direction DRa, is rotatably supported by the bearing 124g that is placed at the inside of the main body cover 124. Furthermore, the other axial side of the shaft 18, which is located on the other side in the axial direction DRa, is supported by a bearing hole portion 121c formed at the bottom wall 121 of the main body 120. The bearing hole portion 121c is formed by a sliding bearing. It should be noted that the bearing hole portion 121c may be formed by a ball bearing or the like instead of the sliding bearing.

Figure 6:
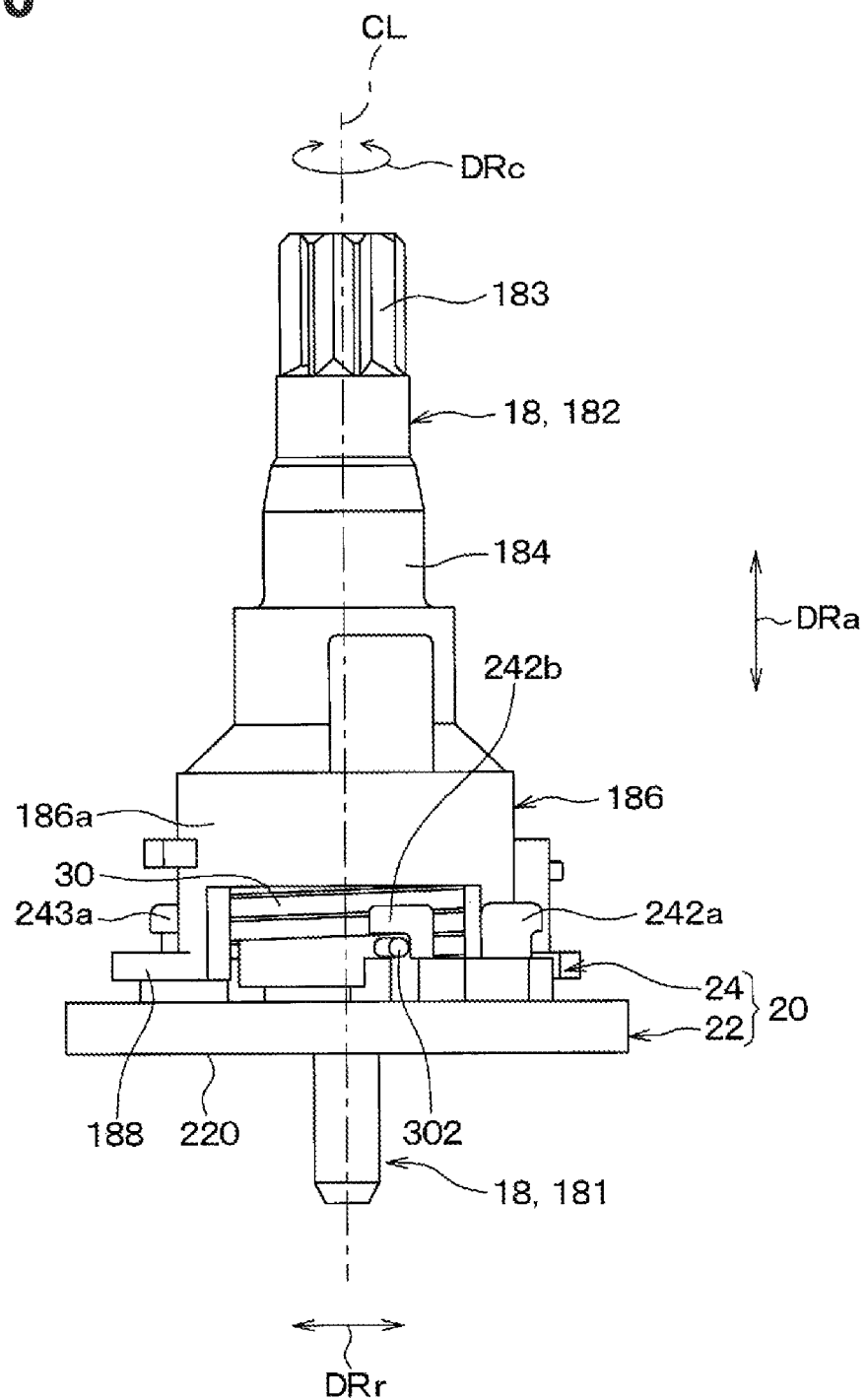
FIG. 6 is a side view of the assembly of the shaft, the rotor and the lever viewed in a direction of an arrow VI in FIG. 5.
Figure 7:
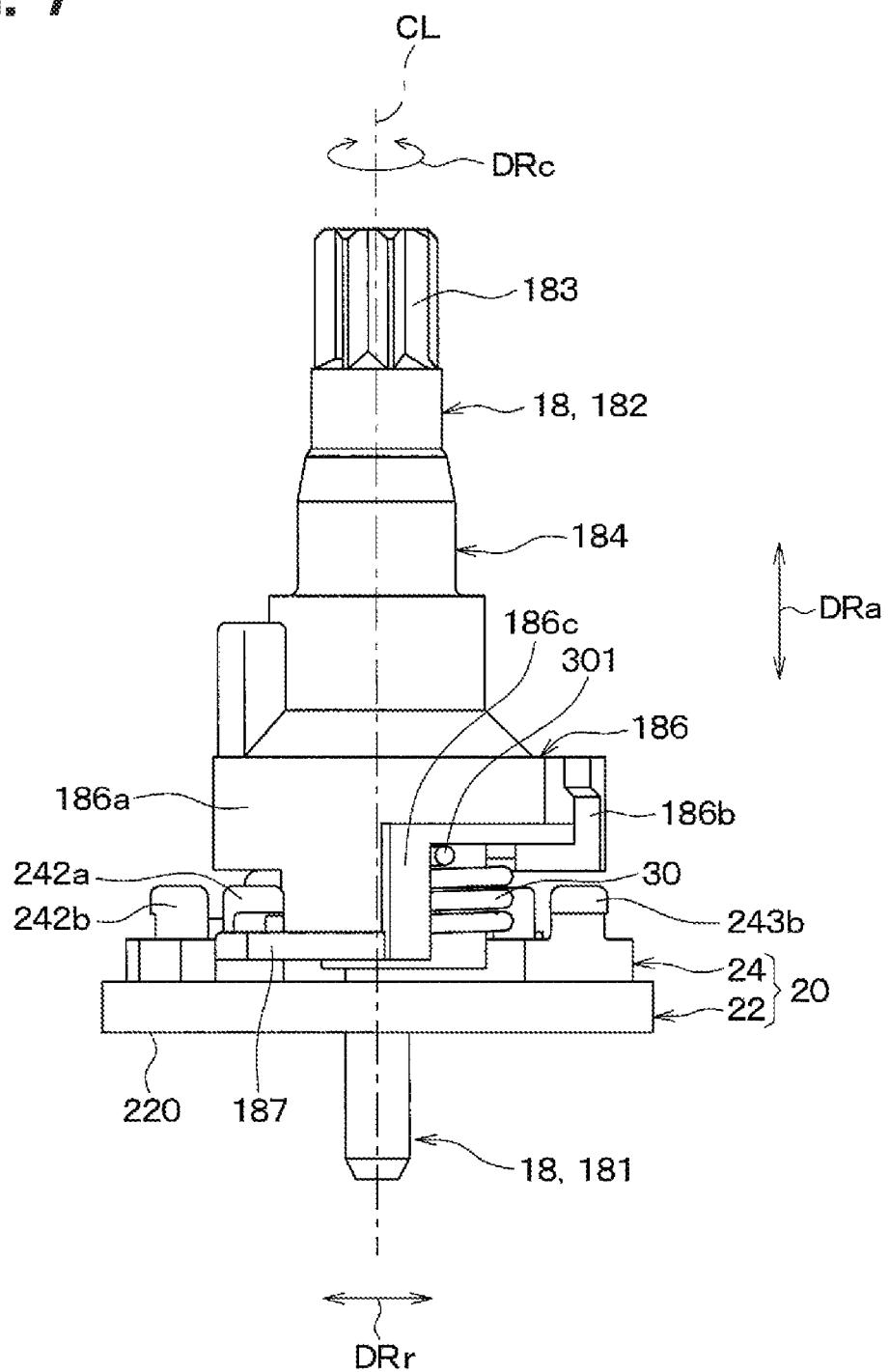
FIG. 7 is a side view of the assembly of the shaft, the rotor and the lever viewed in a direction of an arrow VII in FIG. 5.
Figure 8:
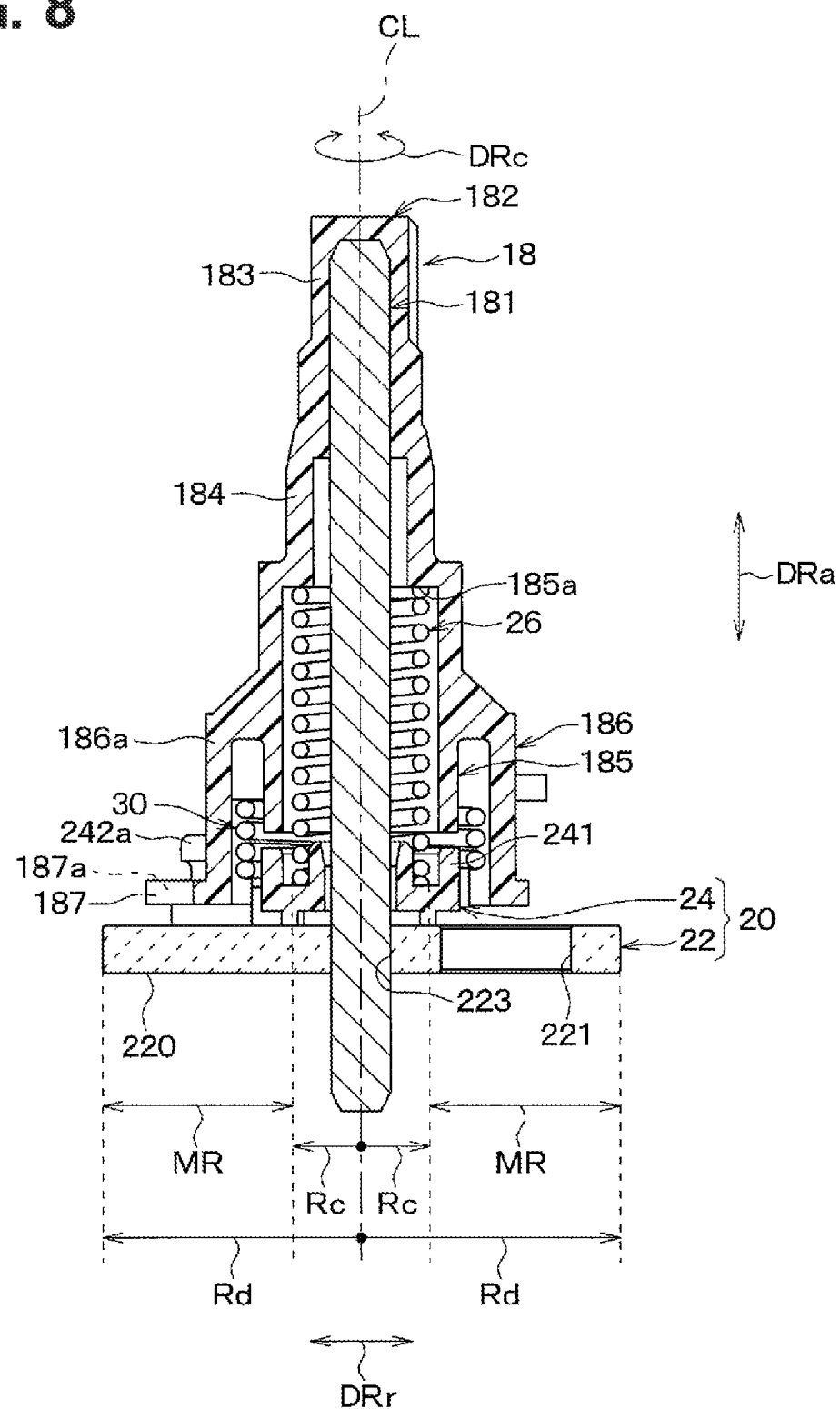
FIG. 8 is a cross-sectional view taken along line VIII-VIII in FIG. 5.
Figure 9:
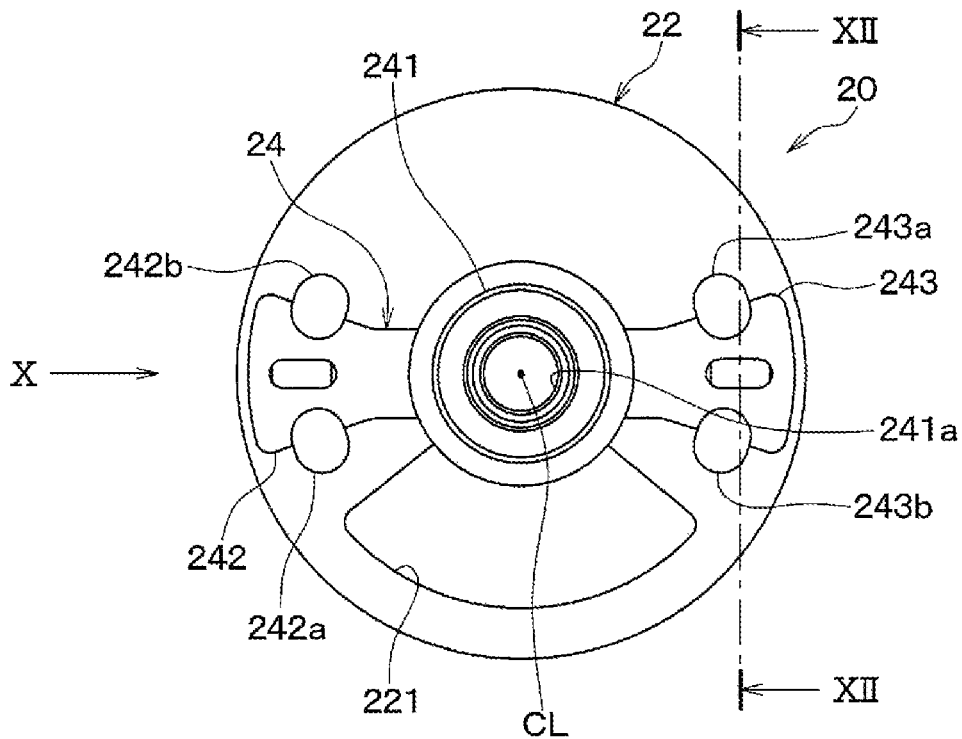
FIG. 9 is a plan view of the rotor.
Figure 10:
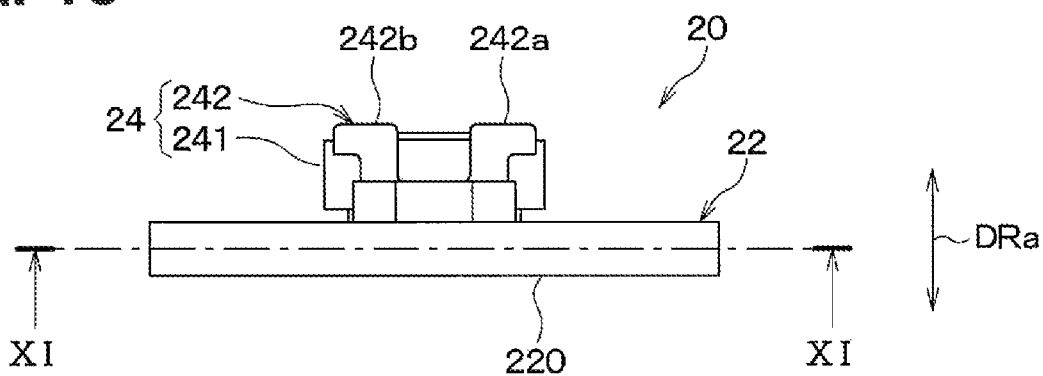
FIG. 10 is a side view of the rotor viewed in a direction of an arrow X in FIG. 9.
Figure 11:
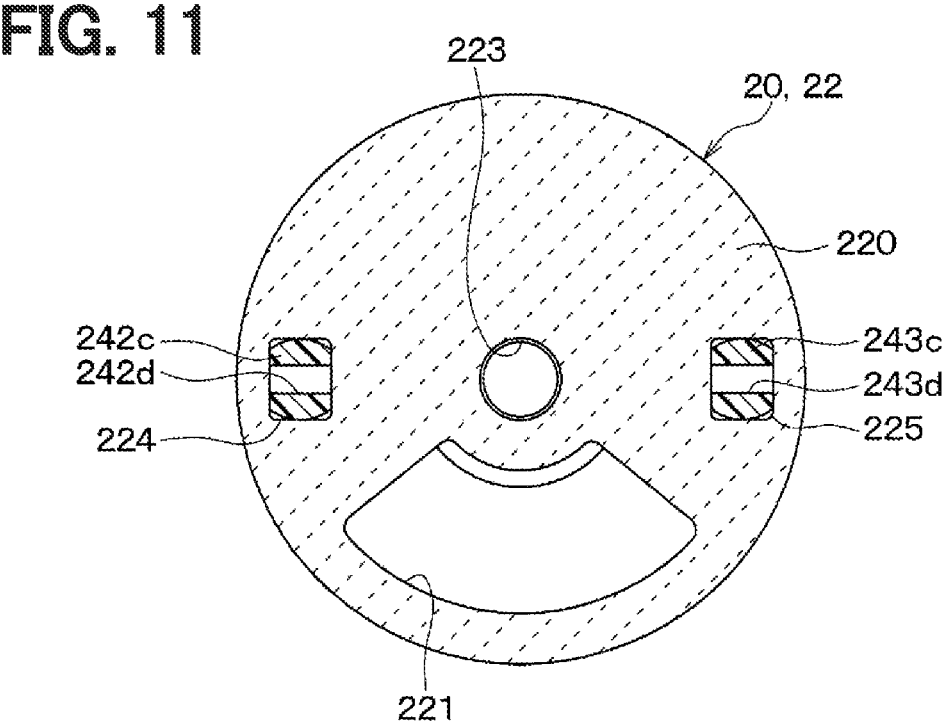
FIG. 11 is a cross-sectional view taken along line XI-XI in FIG. 10.
Figure 12:
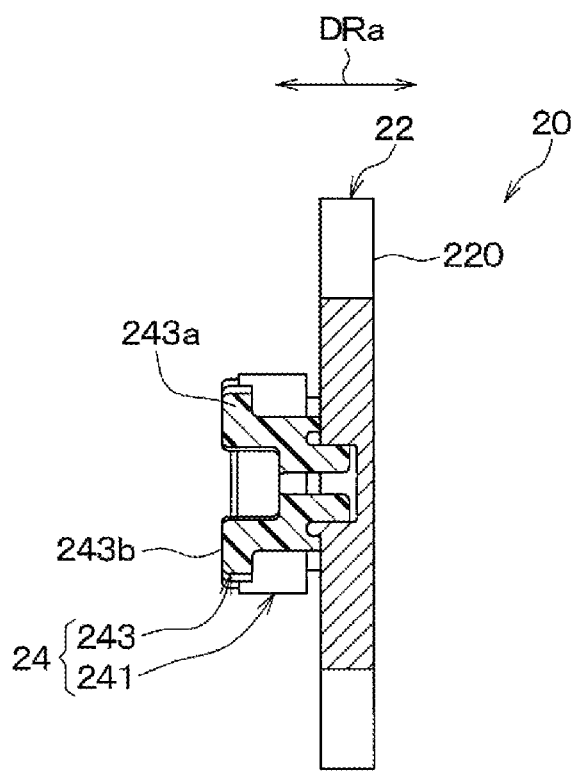
FIG. 12 is a cross-sectional view taken along line XII-XII in FIG. 9.

As shown in FIGS. 6, 7 and 8, the shaft 18 includes a central axis portion 181 and a holder portion 182. The central axis portion 181 is made of metal, and the holder portion 182 is made of resin and is coupled to the central axis portion 181. The central axis portion 181 and the holder portion 182 are coupled together to integrally rotate.

The central axis portion 181 includes the central axis CL of the shaft 18 and extends in the axial direction DRa. The central axis portion 181 is a portion that serves as a rotational center of the rotor 20. The central axis portion 181 is formed by a rod member made of metal to ensure straightness of the central axis portion 181.

The holder portion 182 is coupled to one axial side of the central axis portion 181 which is located on the one side in the axial direction DRa. The holder portion 182 is shaped in a bottomed tubular form. The central axis portion 181 is coupled to a bottom part of the holder portion 182 by press fitting or the like. A portion of the holder portion 182, which projects to the outside of the housing 12, is coupled to the gear arrangement of the drive device 16.

An inner diameter of the holder portion 182 increases stepwise from one side toward the other side in the axial direction DRa. Specifically, the holder portion 182 includes: an axial coupling portion 183 which is located at the one axial side in the axial direction DRa; an intermediate portion 184 which is connected to the axial coupling portion 183; a small diameter portion 185 which is connected to the intermediate portion 184; and a large diameter portion 186 which is connected to the small diameter portion 185. The inner diameter of the holder portion 182 is increased in an order of the axial coupling portion 183, the intermediate portion 184, the small diameter portion 185 and the large diameter portion 186.

The axial coupling portion 183 is a portion that is coupled with the central axis portion 181. The axial coupling portion 183 has the inner diameter that is substantially equal to or slightly smaller than an outer diameter of the central axis portion 181. An outside of the axial coupling portion 183 is supported by the bearing 124g.

The intermediate portion 184 is a portion which is placed at the inside of the boss portion 124c. The intermediate portion 184 has an inner diameter slightly larger than the outer diameter of the central axis portion 181. The shaft seal 124e is placed at an outside of the intermediate portion 184.

The small diameter portion 185 forms a space in which the compression spring 26 described later is placed. The small diameter portion 185 has the inner diameter which is slightly larger than the inner diameter of the intermediate portion 184. A connecting end surface 185a, which connects between the intermediate portion 184 and the small diameter portion 185, is a contact portion to which one end portion of the compression spring 26 contacts. The large diameter portion 186 is connected to an outside of the small diameter portion 185.

The large diameter portion 186 is located on an outer side of the small diameter portion 185 in the radial direction DRr. The large diameter portion 186 has the inner diameter that is slightly larger than the inner diameter of the small diameter portion 185. As shown in FIGS. 5, 6, 7 and 8, the large diameter portion 186 has a body portion 186a shaped in a tubular form, a first large diameter anchoring portion 186b, a second large diameter anchoring portion 186c, a first flange portion 187 and a second flange portion 188.

The first large diameter anchoring portion 186b is a hook anchoring portion to which a hook 282 of the first torsion spring 28 is anchored. As shown in FIG. 7, the first large diameter anchoring portion 186b is formed at an outside of the body portion 186a at one axial side of the body portion 186a, which is located on the one side in the axial direction DRa. The first large diameter anchoring portion 186b outwardly projects from the body portion 186a in the radial direction DRr such that the first large diameter anchoring portion 186b is opposed to the hook 282 of the first torsion spring 28 in the circumferential direction DRc.

The second large diameter anchoring portion 186c is a hook anchoring portion to which a hook 301 of the second torsion spring 30 is anchored. As shown in FIG. 7, the second large diameter anchoring portion 186c is formed at the outside of the body portion 186a on the other side of the first large diameter anchoring portion 186b which is located on the other side in the axial direction DRa. The second large diameter anchoring portion 186c outwardly projects from the body portion 186a in the radial direction DRr such that the second large diameter anchoring portion 186c is opposed to the hook 301 of the second torsion spring 30 in the circumferential direction DRc.

Each of the first flange portion 187 and the second flange portion 188 of the shaft 18 is an anchoring piece that is configured to engage with a corresponding one of engaging portions of a lever 24 described later. Each of the first flange portion 187 and the second flange portion 188 is formed at the outside of the body portion 186a on the other side of the second large diameter anchoring portion 186c which is located on the other side in the axial direction DRa. As shown in FIG. 5, the first flange portion 187 and the second flange portion 188 are shaped to be generally point-symmetric to each other with respect to the central axis CL of the shaft 18. Each of the first flange portion 187 and the second flange portion 188 outwardly projects from the body portion 186a in the radial direction DRr such that each of the first flange portion 187 and the second flange portion 188 is opposed to the corresponding engaging portion of the lever 24 in the circumferential direction DRc.

The first flange portion 187 has a first contact surface 187a that is configured to contact the first engaging claw 242a of the lever 24. The first contact surface 187a is a contact portion of the shaft 18 that is configured to contact the lever 24. The first contact surface 187a is a surface of the first flange portion 187 that is opposed to the first engaging claw 242a in the circumferential direction DRc.

The first contact surface 187a extends in a direction away from the central axis CL of the shaft 18. Specifically, the first contact surface 187a extends in the radial direction DRr. A distance of the first contact surface 187a (more specifically, a distance of any point along the first contact surface 187a) from the central axis CL of the shaft 18 falls in an intermediate range MR that is from a radius Rc of the compression spring 26 to an outer radius Rd of the drive disk 22, and the outer radius Rd of the drive disk 22 corresponds to a distance which is measured from the central axis CL to an outer periphery of the drive disk 22 and is the largest at the drive disk 22. Specifically, a shortest distance Ls1 of the first contact surface 187a from the central axis CL of the shaft 18 is larger than the radius Rc of the compression spring 26. Furthermore, a longest distance Lb1 of the first contact surface 187a from the central axis CL of the shaft 18 is equal to or smaller than the outer radius Rd of the drive disk 22.

The second flange portion 188 has a second contact surface 188a that is configured to contact the third engaging claw 243a of the lever 24. The second contact surface 188a is a contact portion of the shaft 18 that is configured to contact the lever 24. The second contact surface 188a is a surface of the second flange portion 188 that is opposed to the third engaging claw 243a in the circumferential direction DRc.

The second contact surface 188a extends in the direction away from the central axis CL of the shaft 18. Specifically, the second contact surface 188a extends in the radial direction DRr. A distance of the second contact surface 188a (more specifically, a distance of any point along the second contact surface 188a) from the central axis CL of the shaft 18 falls in the intermediate range MR that is from the radius Rc of the compression spring 26 to the outer radius Rd of the drive disk 22, and the outer radius Rd of the drive disk 22 corresponds to the distance which is measured from the central axis CL to the outer periphery of the drive disk 22 and is the largest at the drive disk 22. Specifically, a shortest distance Ls2 of the second contact surface 188a from the central axis CL of the shaft 18 is larger than the radius Rc of the compression spring 26. Furthermore, a longest distance Lb2 of the second contact surface 188a from the central axis CL of the shaft 18 is equal to or smaller than the outer radius Rd of the drive disk 22.

Specifically, the shortest distance Ls2 of the second contact surface 188a is the same as the shortest distance Ls1 of the first contact surface 187a, and the longest distance Lb2 of the second contact surface 188a is the same as the longest distance Lb1 of the first contact surface 187a. As a result, the distance of the first contact surface 187a and the distance of the second contact surface 188a from the central axis CL of the shaft 18 are generally equal to each other. That is, each of the first contact surface 187a and the second contact surface 188a has a segment, a distance of which from the central axis CL of the shaft 18 is equally set at each of the first contact surface 187a and the second contact surface 188a.

The first contact surface 187a of the first flange portion 187 and the second contact surface 188a of the second flange portion 188 are point-symmetric to each other with respect to the central axis CL of the shaft 18. That is, the shape of the first contact surface 187a and the shape of the second contact surface 188a match with each other when the first contact surface 187a and the second contact surface 188a are rotated about the central axis CL of the shaft 18 by 180°. In this specification, the term "match" includes not only a state in which the objects to be compared are completely matched but also a state in which there is a slight deviation that is a manufacturing error level (for example, within 5% of the designed value).

The holder portion 182, which is formed in the above-described manner, receives the urging force of the first torsion spring 28 and the urging force of the second torsion spring 30 by having the first large diameter anchoring portion 186b and the second large diameter anchoring portion 186c.

By having the first contact surface 187a and the second contact surface 188a, the shaft 18, which is formed in the above-described manner, contacts the lever 24 at the different locations which are displaced from each other in the circumferential direction DRc. That is, the shaft 18 has the plurality of contact portions that are configured to contact the lever 24 and are respectively located at the plurality of locations which are displaced from each other in the circumferential direction DRc.

The rotor 20 is rotated about the central axis CL of the shaft 18 by the output of the drive device 16. The rotor 20 increases or decreases the opening degree of each of the flow passage holes 141, 142 of the stationary disk 14 in response to the rotation of the shaft 18. As shown in FIGS. 9, 10, 11 and 12, the rotor 20 includes: the drive disk 22, which serves as a valve element; and the lever 24 which couples the drive disk 22 to the shaft 18.

Figure 13:
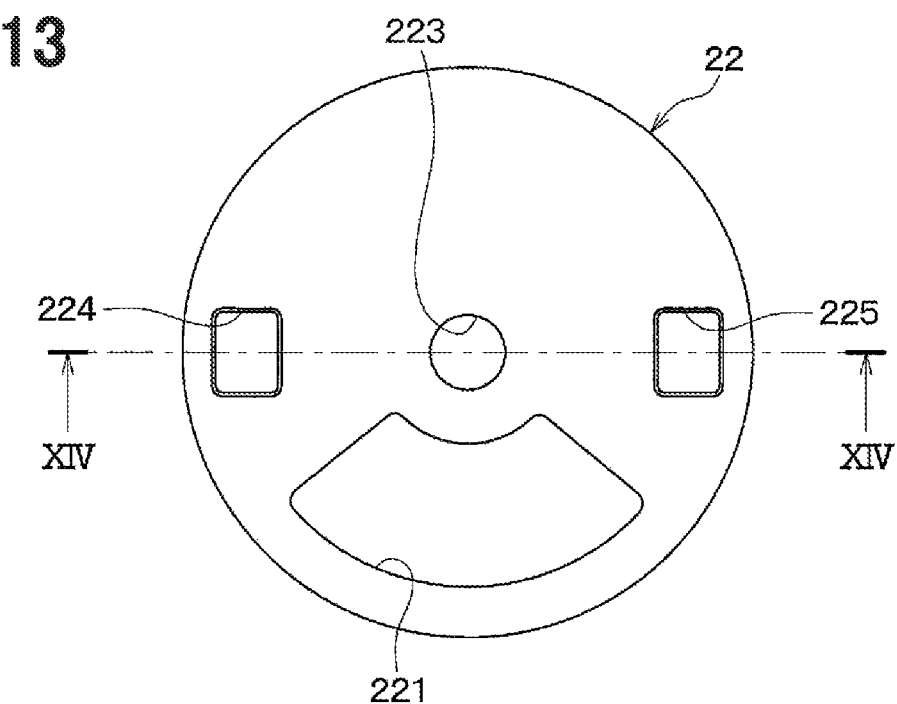
FIG. 13 is a plan view of the drive disk.
Figure 14:
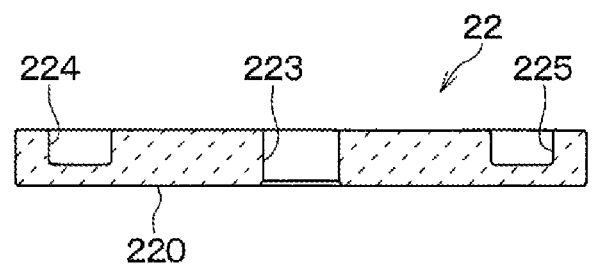
FIG. 14 is a cross-sectional view taken along line XIV-XIV in FIG. 13.
Figure 15:
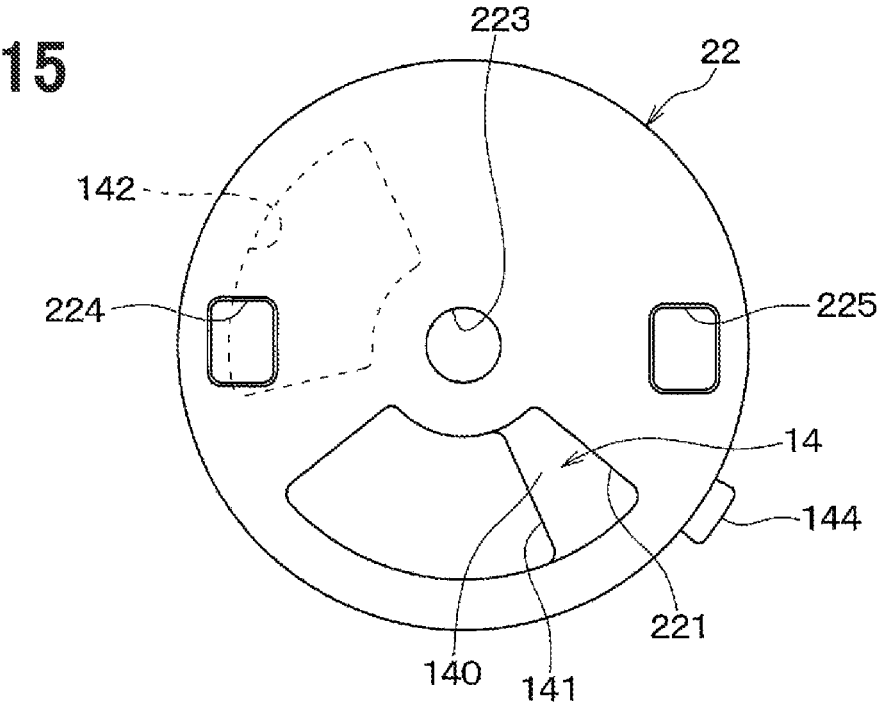
FIG. 15 is a plan view showing a state where the drive disk is placed on the stationary disk.

As shown in FIGS. 13, 14 and 15, the drive disk 22 is the valve element that increases or decreases the opening degree of the first flow passage hole 141 and the opening degree of the second flow passage hole 142 in response to the rotation of the shaft 18. The opening degree of the first flow passage hole 141 is a degree of opening of the first flow passage hole 141. Here, the opening degree of the first flow passage hole 141 in a full-opening state of the first flow passage hole 141 is indicated as 100%, and the opening degree of the first flow passage hole 141 in a full-closing state of the first flow passage hole 141 is indicated as 0%. The full opening state of the first flow passage hole 141 is, for example, a state where the first flow passage hole 141 is not closed by the drive disk 22 at all. The full closing state of the first flow passage hole 141 is, for example, a state where the first flow passage hole 141 is entirely closed by the drive disk 22. The definition of the opening degree of the second flow passage hole 142 is the same as the definition of the opening degree of the first flow passage hole 141 described above.

The drive disk 22 is a circular disk member while a thickness direction of the drive disk 22 coincides with the axial direction DRa. The drive disk 22 is placed in the inlet-side space 12d such that the drive disk 22 is opposed to the stationary disk 14 in the axial direction DRa. The drive disk 22 has the sliding surface 220 that is opposed to the opening surface 140 of the stationary disk 14. The sliding surface 220 is a seal surface that seals the opening surface 140 of the stationary disk 14. The sliding surface 220 is also a contact portion of the drive disk 22 which contacts the stationary disk 14.

It is desirable that the drive disk 22 is made of a material that has a smaller linear expansion coefficient and superior wear resistance than the material of the housing 12. The material of the drive disk 22 is a high-hardness material that is harder than the material of the housing 12. Specifically, the drive disk 22 is made of ceramic. Alternatively, the drive disk 22 may be formed such that only a portion of the drive disk 22, which forms the sliding surface 220, is made of the material, such as the ceramic, which has the smaller linear expansion coefficient and the superior wear resistance than the material of the housing 12.

The ceramic is a material that has: a small linear expansion coefficient; a small dimensional change upon absorption of water; and excellent wear resistance. When the drive disk 22 is made of the ceramic, a relative positional relationship between the drive disk 22 and the shaft 18 and a relative positional relationship between the drive disk 22 and the housing 12 are stabilized. As a result, it is possible to ensure the accuracy of the flow rate control of the fluid and limit unintended fluid leakage.

A rotor hole 221 is formed at the drive disk 22 at a location that is displaced from the central axis CL of the shaft 18. The rotor hole 221 is a through-hole that extends through the drive disk 22 in the axial direction DRa. The rotor hole 221 is formed at a portion of the drive disk 22 where the rotor hole 221 can overlap with the first flow passage hole 141 and the second flow passage hole 142 in the axial direction DRa when the drive disk 22 is rotated about central axis CL of the shaft 18.

A shaft insertion hole 223, through which the shaft 18 is inserted, is formed generally at a center of the drive disk 22. The shaft insertion hole 223 has an inner diameter that is larger than the diameter of the shaft 18 so as to limit sliding of the shaft 18 along the shaft insertion hole 223.

In the valve device 10, when the drive disk 22 is rotated such that the rotor hole 221 overlaps with the first flow passage hole 141 in the axial direction DRa, the first flow passage hole 141 is opened. Furthermore, in the valve device 10, when the drive disk 22 is rotated such that the rotor hole 221 overlaps with the second flow passage hole 142 in the axial direction DRa, the second flow passage hole 142 is opened.

The drive disk 22 is configured to adjust a flow rate ratio between a flow rate of the fluid, which passes through the first flow passage hole 141, and a flow rate of the fluid, which passes through the second flow passage hole 142. That is, the drive disk 22 is configured to decrease the opening degree of the second flow passage hole 142 in response to an increase in the opening degree of the first flow passage hole 141.

The lever 24 is a coupling member that couples the drive disk 22 to the shaft 18. The lever 24 is fixed to the drive disk 22 and couples between the drive disk 22 and the shaft 18 to enable integral rotation of the drive disk 22 and the shaft 18 in a state where the drive disk 22 is displaceable in the axial direction DRa of the shaft 18.

Figure 16:
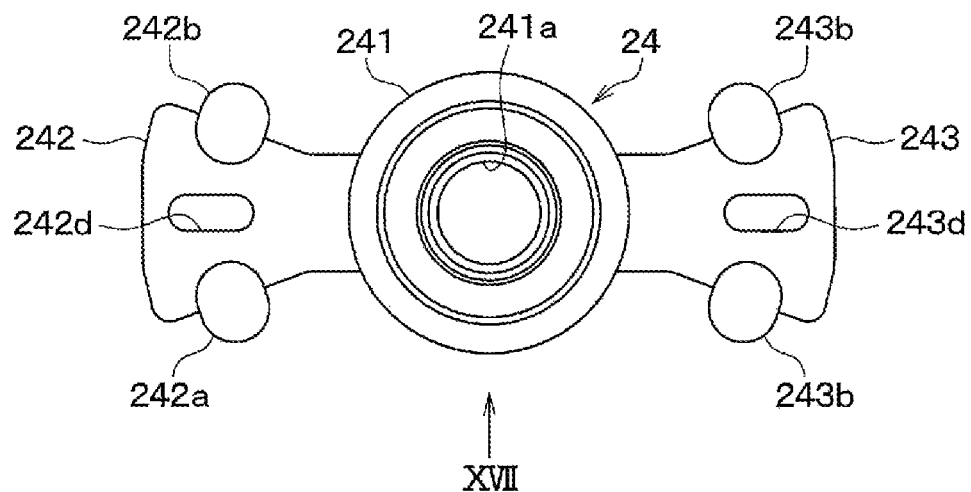
FIG. 16 is a plan view of the lever.
Figure 17:
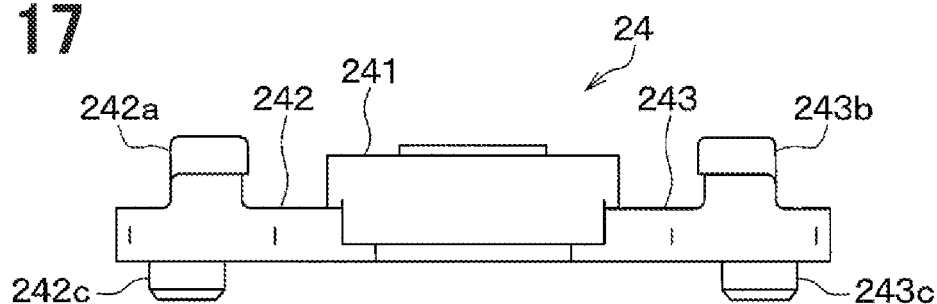
FIG. 17 is a side view of the lever viewed in a direction of an arrow XVII in FIG. 16.
Figure 18:
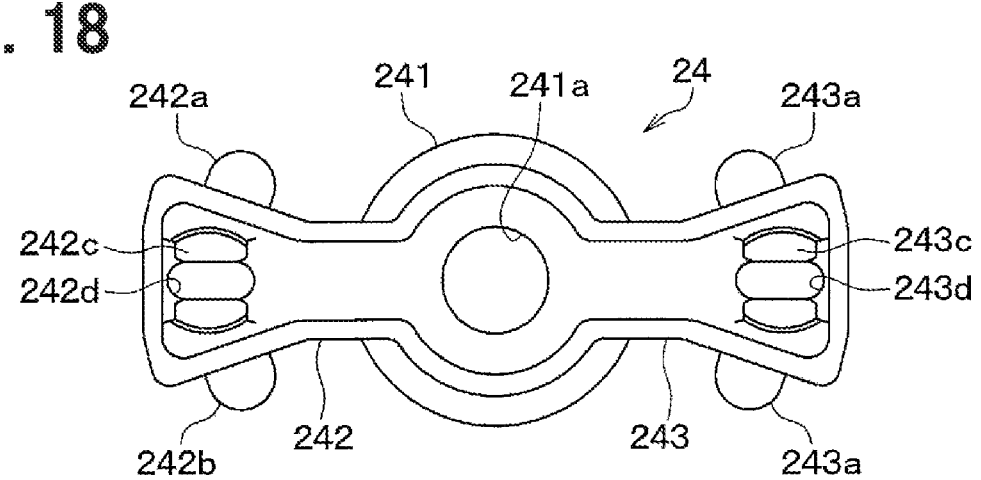
FIG. 18 is a bottom view of the lever.

Specifically, as shown in FIGS. 16, 17 and 18, the lever 24 includes a circular disk portion 241, a first arm portion 242 and a second arm portion 243. The circular disk portion 241, the first arm portion 242 and the second arm portion 243 are formed integrally in one-piece as an integral molded product.

An intermediate insertion hole 241a, through which the shaft 18 is inserted, is formed generally at a center of the circular disk portion 241. The circular disk portion 241 is sized such that the circular disk portion 241 does not overlap with the rotor hole 221 in the axial direction DRa. The first arm portion 242 and the second arm portion 243 are joined to the circular disk portion 241.

Each of the first arm portion 242 and the second arm portion 243 outwardly projects from the circular disk portion 241 in the radial direction DRr. The first arm portion 242 and the second arm portion 243 project in opposite directions, respectively.

Specifically, the first arm portion 242 has a first engaging claw 242a and a second engaging claw 242b which project in the axial direction DRa from a side of the first arm portion 242 that is opposite to an opposing surface of the first arm portion 242 opposed to the drive disk 22. Each of the first engaging claw 242a and the second engaging claw 242b is shaped in an L-shape. A root side of each of the first engaging claw 242a and the second engaging claw 242b extends in the axial direction DRa, and a distal end side of each of the first engaging claw 242a and the second engaging claw 242b projects in the circumferential direction DRc. The distal end side of the first engaging claw 242a and the distal end side of the second engaging claw 242b project in opposite directions, which are away from each other.

The first engaging claw 242a is configured to engage with the first flange portion 187 of the shaft 18. That is, the first engaging claw 242a is the engaging portion that is configured to engage with the contact portion of the shaft 18. The first engaging claw 242a has a portion that is opposed to the first flange portion 187 in the axial direction DRa and the circumferential direction DRc.

Here, as shown in FIGS. 6 and 7, the first engaging claw 242a engages with the first flange portion 187 in a state where a gap is formed between the first engaging claw 242a and the first flange portion 187 in the axial direction DRa. Thereby, the lever 24 and the drive disk 22 are coupled to the shaft 18 in a state where the lever and the drive disk 22 are displaceable in the axial direction DRa.

The second engaging claw 242b is a hook anchoring portion to which a hook 302 of the second torsion spring 30 is anchored. When the hook 302 of the second torsion spring 30 is anchored to the second engaging claw 242b, an urging force of the second torsion spring 30 is applied to the lever 24. As a result, the contact state, in which the first engaging claw 242a and the first flange portion 187 contact with each other, is maintained by the urging force of the second torsion spring 30. The first engaging claw 242a is a contact portion that is configured to contact the shaft 18.

A first protrusion 242c is formed at an opposing surface of the first arm portion 242 which is opposed to the drive disk 22. The first protrusion 242c protrudes toward the drive disk 22 such that the first protrusion 242c can be press-fitted into a first press-fitting groove 224 formed at the drive disk 22. The first protrusion 242c has a first slit 242d that extends through a center portion of the first protrusion 242c from a front side to a back side thereof. A degree of freedom of deformation of the first protrusion 242c at the time of press-fitting the first protrusion 242c into the first press-fitting groove 224 is increased by forming the first slit 242d at the first protrusion 242c.

The second arm portion 243 has a third engaging claw 243a and a fourth engaging claw 243b which project in the axial direction DRa from a side of the second arm portion 243 that is opposite to an opposing surface of the second arm portion 243 opposed to the drive disk 22. The third engaging claw 243a and the fourth engaging claw 243b are configured substantially the same manner as that of the first engaging claw 242a and the second engaging claw 242b.

The third engaging claw 243a is configured to engage with the second flange portion 188 of the shaft 18. That is, the third engaging claw 243a is the engaging portion that is configured to engage with the contact portion of the shaft 18. The third engaging claw 243a has a portion that is opposed to the second flange portion 188 in the axial direction DRa and the circumferential direction DRc.

Although not shown in the drawing, the third engaging claw 243a engages with the second flange portion 188 in a state where a gap is formed between the third engaging claw 243a and the second flange portion 188 in the axial direction DRa. Thereby, the lever 24 and the drive disk 22 are coupled to the shaft 18 in a state where the lever 24 and the drive disk 22 are displaceable in the axial direction DRa.

A second protrusion 243c is formed at an opposing surface of the second arm portion 243 which is opposed to the drive disk 22. The second protrusion 243c protrudes toward the drive disk 22 such that the second protrusion 243c can be press-fitted into a second press-fitting groove 225 formed at the drive disk 22. The second protrusion 243c has a second slit 243d that extends through a center portion of the second protrusion 243c from a front side to a back side thereof. A degree of freedom of deformation of the second protrusion 243c at the time of press-fitting the second protrusion 243c into the second press-fitting groove 225 is increased by forming the second slit 243d at the second protrusion 243c.

The lever 24, which is configured in the above-described manner, is fixed to the drive disk 22 by press-fitting the protrusions 242c, 243c into the press-fitting grooves 224, 225, respectively. In the lever 24 of the present embodiment, the first arm portion 242 and the second arm portion 243 have substantially the identical shape so as to be point-symmetric to each other with respect to the intermediate insertion hole 241a. As a result, even in a state where the lever 24 is rotated by 180° in the circumferential direction DRc, the lever 24 can be assembled to the shaft 18 and the drive disk 22.

As shown in FIGS. 3 and 8, the compression spring 26 is a spring that urges the rotor 20 against the stationary disk 14. The compression spring 26 is a resilient member which is resiliently deformable in the axial direction DRa of the shaft 18. The compression spring 26 is placed at the inside of the housing 12 in a state where the compression spring 26 is compressed in the axial direction DRa. The one end portion of the compression spring 26, which faces the one side in the axial direction DRa, contacts the shaft 18, and the other end portion of the compression spring 26, which faces the other side in the axial direction DRa, contacts the rotor 20. More specifically, the one end portion of the compression spring 26, which faces the one side in the axial direction DRa, contacts the connecting end surface 185a of the inside of the holder portion 182, and the other end portion of the compression spring 26, which faces the other side in the axial direction DRa, contacts the circular disk portion 241. The compression spring 26 is not fixed to at least one of the rotor 20 and the shaft 18, so that the compression spring 26 does not function as a torsion spring.

The compression spring 26 urges the rotor 20 against the stationary disk 14, so that a contact state, in which the opening surface 140 of the stationary disk 14 and the sliding surface 220 of the drive disk 22 contact with each other, is maintained. This contact state is a state in which the opening surface 140 of the stationary disk 14 and the sliding surface 220 of the drive disk 22 make a surface-to-surface contact with each other. That is, the valve device 10 can maintain a posture of the drive disk 22 such that the drive disk 22 is in contact with the stationary disk 14.

Specifically, the compression spring 26 is arranged to surround the central axis CL of the shaft 18. With this configuration, a load of the compression spring 26 on the drive disk 22 is restrained from being locally increased in the circumferential direction DRc of the shaft 18, so that the contact state between the sliding surface 220 and the opening surface 140 can be easily maintained.

The compression spring 26 has two opposite end portions respectively formed as a closed end and is used as the compression spring 26 to limit tilting of the compression spring 26 relative to the central axis CL of the shaft 18. The spring, which has the closed ends, is a spring where a helix angle of the end coil is progressively reduced until the end coil touches an adjacent coil. Alternatively, a compression spring, which has two opposite end portions respectively formed as an open end, may be used as the compression spring 26.

The first torsion spring 28 is a spring that urges the shaft 18 relative to the housing 12 in the circumferential direction DRc around the central axis CL of the shaft 18. The first torsion spring 28 is placed between the housing 12 and the shaft 18.

Specifically, the first torsion spring 28 has two hooks 281, 282 which are located at two opposite ends, respectively, of the first torsion spring 28 in the axial direction DRa and outwardly project in the radial direction DRr. For convenience of explanation, hereinafter, the hook 281, which is located on the one side in the axial direction DRa, will be referred to as a first hook 281, and the hook 282, which is located on the other side in the axial direction DRa, will be referred to as a second hook 282.

Figure 19:
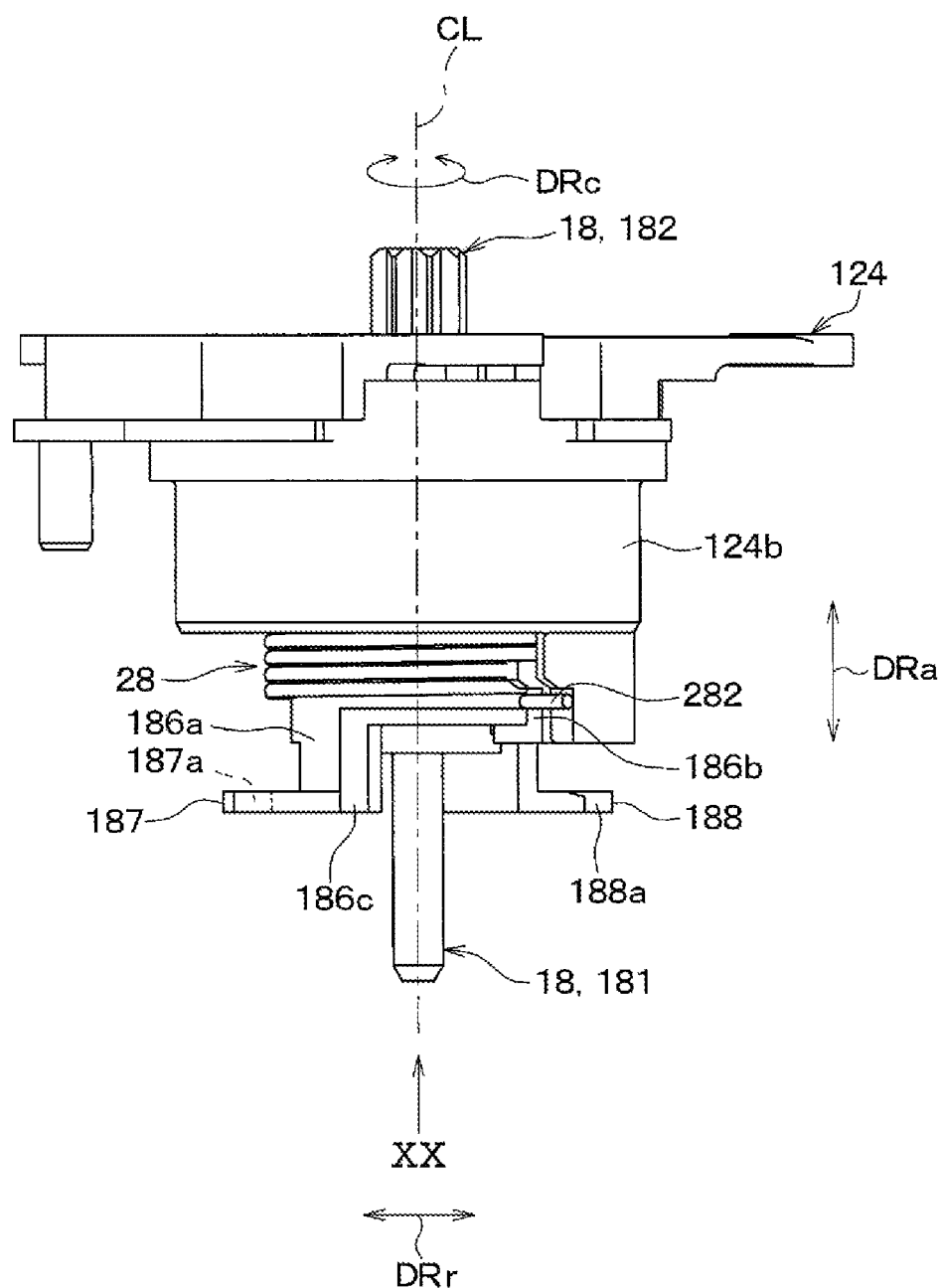
FIG. 19 is a side view of an assembly in which the shaft is assembled to a main body cover.
Figure 20:
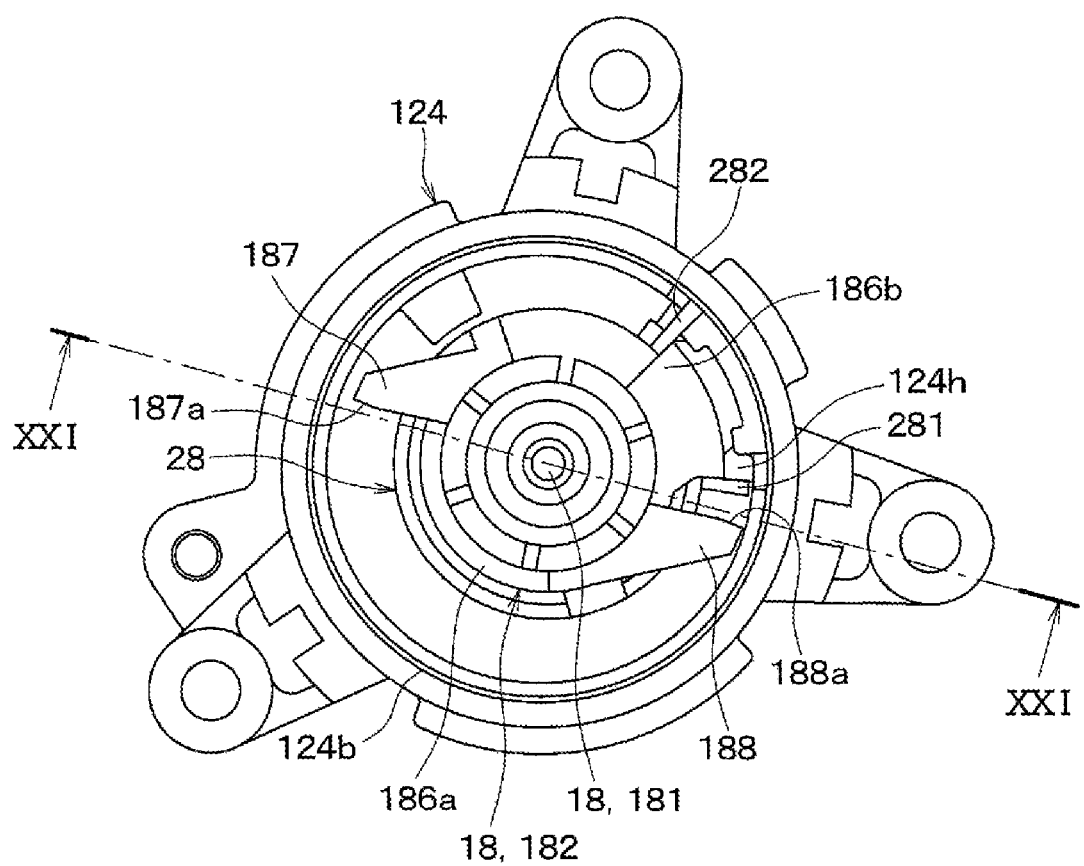
FIG. 20 is a bottom view of the assembly, in which the shaft is assembled to the main body cover, viewed in a direction of an arrow XX in FIG. 19.

As shown in FIGS. 19 and 20, the second hook 282 is anchored to the first large diameter anchoring portion 186b of the holder portion 182. Since the second hook 282 is anchored to the first large diameter anchoring portion 186b, which is a rotatable member, a position of the second hook 282 changes in the circumferential direction DRc when the rotor 20 is rotated.

Figure 21:
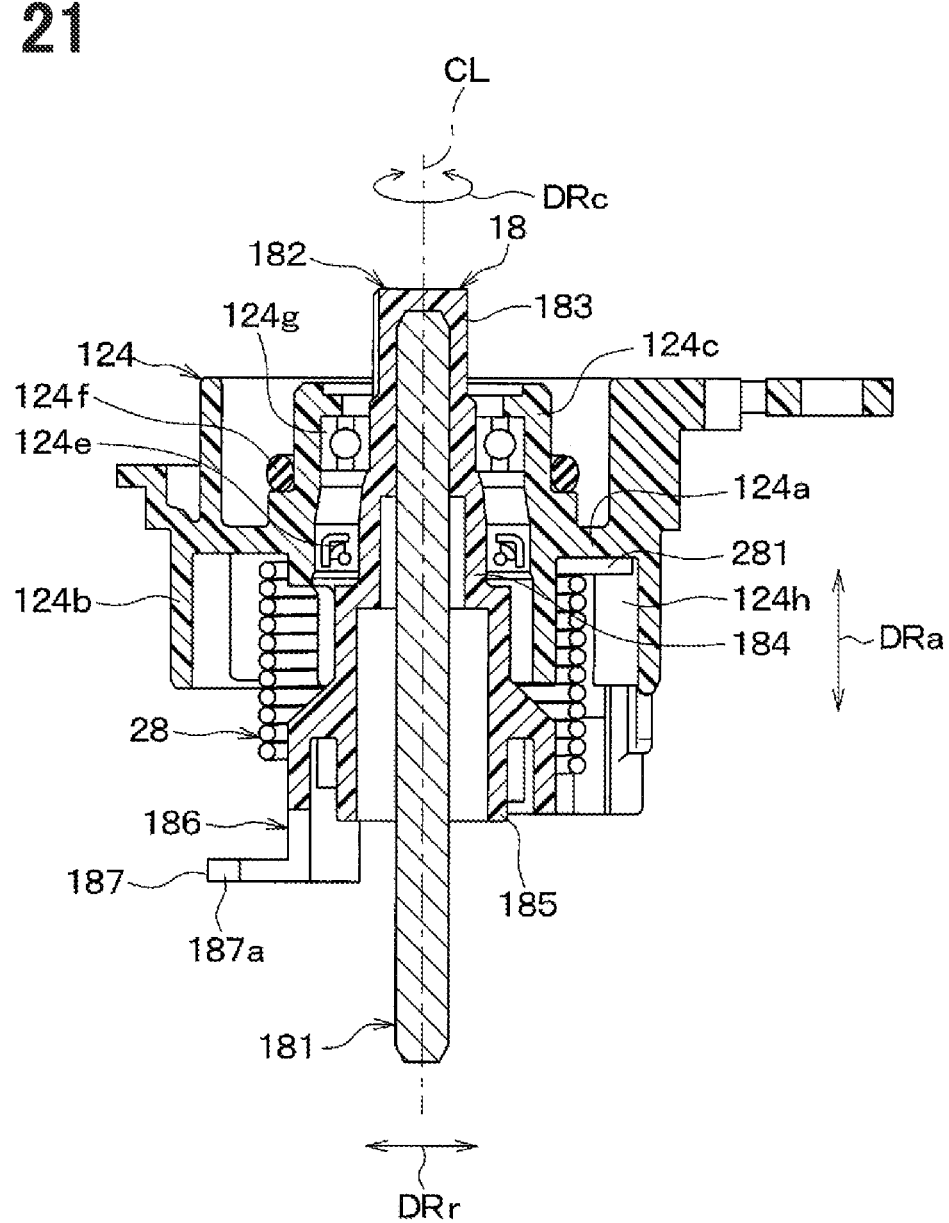
FIG. 21 is a cross-sectional view taken along line XXI-XXI in FIG. 20.

As shown in FIGS. 20 and 21, the first hook 281 is anchored to a main body-side anchoring portion 124h of the main body cover 124. The main body-side anchoring portion 124h is formed by a protrusion that is formed at the inside of the rib portion 124b. Since the first hook 281 is anchored to the main body cover 124, which is a non-rotatable member, a position of the first hook 281 does not change even when the rotor 20 is rotated.

The first torsion spring 28 is basically used in a state where the first torsion spring 28 is twisted and resiliently deformed in the circumferential direction DRc. The urging force of the first torsion spring 28 is exerted to the shaft 18 at the time of rotating the shaft 18 and at the time of stopping the rotation of the shaft 18. The urging force of the first torsion spring 28 is transmitted as a rotational force from the gear arrangement of the drive device 16 to the electric motor through the shaft 18. Therefore, by placing the first torsion spring 28 between the housing 12 and the shaft 18, rattling in the circumferential direction DRc between the drive device 16 and the shaft 18 is limited. Note that the first torsion spring 28 is only twisted in the circumferential direction DRc and is not compressed in the axial direction DRa.

The second torsion spring 30 is a spring that urges the lever 24 relative to the shaft 18 in the circumferential direction DRc. The second torsion spring 30 is placed between the shaft 18 and the lever 24. A dimension of the second torsion spring 30 in the axial direction DRa and a dimension of the second torsion spring 30 in the radial direction DRr are smaller than those of the first torsion spring 28.

The second torsion spring 30 has the two hooks 301, 302 which are located at two opposite ends, respectively, of the second torsion spring 30 in the axial direction DRa and outwardly project in the radial direction DRr. For convenience of explanation, hereinafter, the hook 301, which is located on the one side in the axial direction DRa, will be referred to as a third hook 301, and the hook 302, which is located on the other side in the axial direction DRa, will be referred to as a fourth hook 302.

As shown in FIGS. 6 and 7, the third hook 301 of the second torsion spring 30 is anchored to the second large diameter anchoring portion 186c of the holder portion 182. Furthermore, as shown in FIG. 7, the fourth hook 302 is anchored to the second engaging claw 242b of the lever 24.

The second torsion spring 30 is basically used in a state where the second torsion spring 30 is twisted and resiliently deformed in the circumferential direction DRc. The urging force of the second torsion spring 30 is exerted to the lever 24 at the time of rotating the shaft 18 and at the time of stopping the rotation of the shaft 18. The urging force of the second torsion spring 30 is transmitted as a rotational force to the drive disk 22 through the lever 24. Therefore, by placing the second torsion spring 30 between the shaft 18 and the lever 24, rattling in the circumferential direction DRc between the shaft 18 and the lever 24 is limited. Since the lever 24 is fixed to the drive disk 22, the second torsion spring 30 limits rattling in the circumferential direction DRc in the transmission path that is from the shaft 18 to the drive disk 22. Note that the second torsion spring 30 is only twisted in the circumferential direction DRc and is not compressed in the axial direction DRa.

In the valve device 10, in the state where the second torsion spring 30 is interposed between the shaft 18 and the lever 24, the first flange portion 187 engages with the first engaging claw 242a of the lever 24, and the second flange portion 188 engages the third engaging claw 243a of the lever 24. Therefore, three components, i.e., the shaft 18, the lever 24 and the second torsion spring 30 are assembled together as a sub-assembly. Specifically, in the valve device 10 of the present embodiment, in the state where the compression spring 26 and the second torsion spring 30 are interposed between the shaft 18 and the lever 24, the contact portions of the shaft 18 engage with the engaging portions, respectively, of the lever 24. Therefore, four components, i.e., the shaft 18, the lever 24, the compression spring 26 and the second torsion spring 30 are assembled together as a sub-assembly.

Next, an operation of the valve device 10 of the present embodiment will be described. In the valve device 10, as shown in FIGS. 1, 2 and 3, the fluid flows from the inlet port 12a into the inlet-side space 12d, as indicated by an arrow Fi. In a case where the first flow passage hole 141 is opened, the fluid flows from the inlet-side space 12d into the first outlet-side space through the first flow passage hole 141. The fluid, which is supplied into the first outlet-side space, flows from the first outlet-side space to the outside of the valve device 10 through the first outlet port 12b, as indicated by an arrow F10. In this case, the flow rate of the fluid, which passes through the first flow passage hole 141, is determined according to the opening degree of the first flow passage hole 141. That is, the flow rate of the fluid, which flows from the inlet port 12a to the first outlet port 12b through the first flow passage hole 141, is increased when the opening degree of the first flow passage hole 141 is increased.

In a case where the second flow passage hole 142 is opened, the fluid flows from the inlet-side space 12d into the second outlet-side space through the second flow passage hole 142. The fluid, which is supplied into the second outlet-side space, flows from the second outlet-side space to the outside of the valve device 10 through the second outlet port 12c, as indicated by an arrow F20. In this case, the flow rate of the fluid, which passes through the second flow passage hole 142, is determined according to the opening degree of the second flow passage hole 142. That is, the flow rate of the fluid, which flows from the inlet port 12a to the second outlet port 12c through the second flow passage hole 142, is increased when the opening degree of the second flow passage hole 142 is increased.

The valve device 10 described above can provide, for example, the following advantages.

(1) The rotor 20 of the valve device 10 includes: the drive disk 22; and the lever 24 that is fixed to the drive disk 22 and couples between the drive disk 22 and the shaft 18 to enable integral rotation of the drive disk 22 and the shaft 18 in the state where the drive disk 22 is displaceable in the axial direction DRa of the shaft 18. In the valve device 10, the first torsion spring 28 is placed between the housing 12 and the shaft 18, and the second torsion spring 30 is placed between the shaft 18 and the lever 24.

Therefore, as long as the first torsion spring 28 urges the shaft 18 relative to the housing 12 in the circumferential direction DRc, the rattling in the circumferential direction DRc between the drive device 16 and the shaft 18 is limited. In addition, as long as the second torsion spring 30 urges the lever 24 relative to the shaft 18 in the circumferential direction DRc, the rattling in the circumferential direction DRc between the shaft 18 and the lever 24 is limited. Since the lever 24 is fixed to the drive disk 22, the second torsion spring 30 limits the rattling in the circumferential direction DRc between the shaft 18 and the drive disk 22.

Therefore, the rattling in the circumferential direction DRc in the transmission path from the drive device 16 to the rotor 20 can be limited, and thereby the variations in the opening degrees of the flow passage holes 141, 142 caused by the rattling can be limited.

Figure 22:
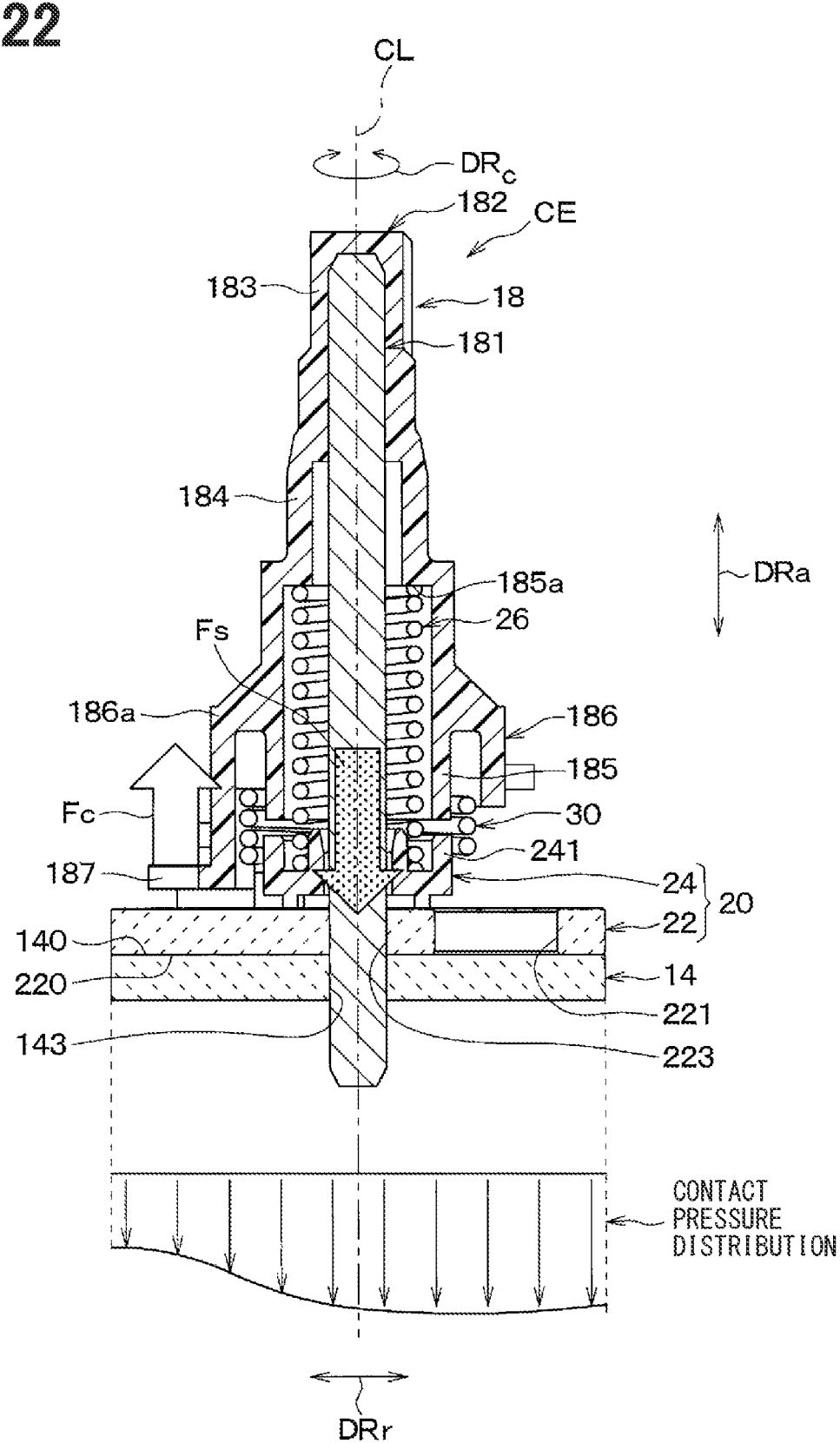
FIG. 22 is an explanatory diagram for explaining a contact pressure at a contact portion of each disk in a valve device of a comparative example.

FIG. 22 is an explanatory diagram for explaining a contact pressure at a contact portion of each of the disks 14, 22 in a valve device CE of a comparative example. The valve device CE of the comparative example differs from the valve device 10 of the present embodiment only in that the second flange portion 288 is not formed at the shaft 18. For convenience of explanation, in FIG. 22, at the valve device CE of the comparative example, the same reference signs as those of the valve device 10 of the present embodiment are given to the components that are common to the valve device 10 of the present embodiment.

As shown in FIG. 22, in the valve device CE of the comparative example, the shaft 18 and the lever 24 contact with each other through the first flange portion 187 and the first engaging claw 242a, and there is no other contact location between the shaft 18 and the lever 24. That is, in the valve device CE of the comparative example, the shaft 18 and the lever 24 contact at the single location which is spaced away from the center of the shaft 18, and the torque from the second torsion spring 30 is intensively applied to this location. In this case, the first contact surface 187a and the first engaging claw 242a, which are the contact portions of the lever 24 and the shaft 18, tend to wear out.

In addition, in the case where the localized friction is generated at the single contact location between the lever 24 and the shaft 18, a large frictional force Fc is generated at this location in a direction that is opposite to a direction of the urging force Fs of the compression spring 26. As a result, the contact pressure at the contact portions of the stationary disk 14 and the drive disk 22, which contact with each other, is locally increased, and thereby the contact portions of the disks 14, 22 are likely to wear out. Specifically, the contact pressure of the contact portion of each of the disks 14, 22 decreases near the contact location between the lever 24 and the shaft 18 and increases at a location distant from the contact location between the lever 24 and the shaft 18.

In contrast, the shaft 18 of the valve device 10 of the present embodiment has the second contact surface 188a at a location that is displaced from the location of the first contact surface 187a in the circumferential direction DRc. The lever 24 and the shaft 18 are configured to contact with each other at the two different locations which are displaced from each other in the circumferential direction DRc.

Furthermore, in the valve device 10 configured in the above-described manner, since the shaft 18 and the lever 24 come into contact with each other through the plurality of contact portions respectively located at the plurality of locations of the shaft 18, the torque from the second torsion spring 30 is dispersed at the plurality of locations. Therefore, the wearing at the respective contact portions of the shaft 18 and the lever 24, which are configured to contact with each other, is limited.

Figure 23:
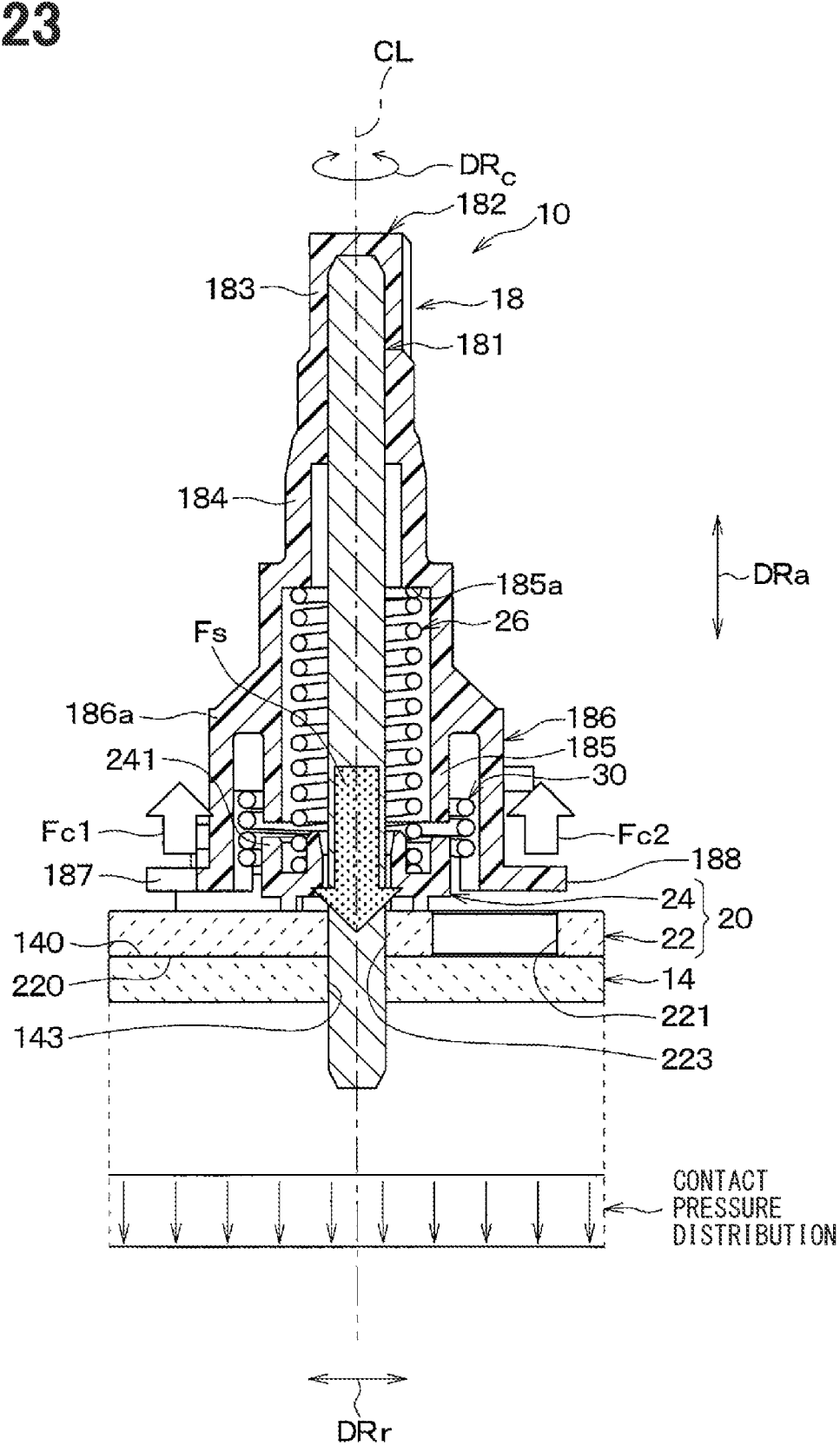
FIG. 23 is an explanatory diagram for explaining a contact pressure at a contact portion of each disk in the valve device of the embodiment.

Here, as shown in FIG. 23, frictional forces $Fc1$, $Fc2$ are generated and dispersed at the different contact locations which are displaced from each other in the circumferential direction DRc. In addition, the frictional forces $Fc1$, $Fc2$, which are exerted at the valve device 10 of the present embodiment, are smaller than the frictional force Fc exerted at the valve device CE of the comparative example. As a result, in the valve device 10, the locally increased contact pressure between the drive disk 22 and the stationary disk 14 is limited, and thereby the wearing of the respective contact portions of the drive disk 22 and the stationary disk 14 is limited.

Particularly, the first contact surface 187a and the second contact surface 188a of the present embodiment are point-symmetric to each other with respect to the central axis CL of the shaft 18. Therefore, the substantially equal frictional forces $Fc1$, $Fc2$ are exerted at the first contact surface 187a and the second contact surface 188a, respectively. As a result, in the valve device 10, the contact pressure between the drive disk 22 and the stationary disk 14 become uniform throughout the contact portions of the drive disk 22 and the stationary disk 14, and thereby the wearing of the respective contact portions of the drive disk 22 and the stationary disk 14 is limited.

Therefore, the valve device 10 of the present embodiment can limit the wearing of the stationary disk 14, the shaft 18 and the rotor 20 while limiting the rattling in the circumferential direction DRc between the rotor 20 and the shaft 18.

(2) In the valve device 10, the compression spring 26, which urges the rotor 20 against the stationary disk 14, is arranged to surround the central axis CL of the shaft 18. The distance of each of the first contact surface 187a and the second contact surface 188a from the central axis CL of the shaft 18 falls in the intermediate range that is from the radius Rc of the compression spring 26 to the outer radius Rd of the drive disk 22. According to this configuration, it is possible to limit the variations in the torque applied to the respective contact surfaces 187a, 188a. As a result, the locally increased contact pressure between the drive disk 22 and the stationary disk 14 is limited, and thereby the wearing of the respective contact portions of the drive disk 22 and the stationary disk 14 is limited.

(3) Each of the first contact surface 187a and the second contact surface 188a extends in the direction away from the central axis CL of the shaft 18 and has the segment, the distance of which from the central axis CL of the shaft 18 is equally set at each of the first contact surface 187a and the second contact surface 188a. With this configuration, the variations in the torque applied to the respective contact surfaces 187a, 188a is limited, and thereby the locally increased contact pressure between the drive disk 22 and the stationary disk 14 is limited. Thus, the wearing of the respective contact portions of the drive disk 22 and the stationary disk 14 is limited.

(4) The lever 24 has the first engaging claw 242a and the third engaging claw 243a which are configured to engage with the first contact surface 187a and the second contact surface 188a, respectively, in the state where the second torsion spring 30 is interposed between the lever 24 and the shaft 18. According to this, the three components, i.e., the lever 24, the second torsion spring 30 and the shaft 18 can be assembled together as the sub-assembly by engaging the engaging portions of the lever 24 with the contact portions of the shaft 18 in the state where the second torsion spring 30 is interposed between the lever 24 and the shaft 18. This greatly contributes to the improvement of the assemblability of the valve device 10.

(5) The shaft 18 includes: the central axis portion 181 that is made of the metal and includes the central axis CL while the central axis portion 181 extends in the axial direction DRa; and the holder portion 182 that is made of the resin and is coupled to the central axis portion 181. The holder portion 182 is configured to receive the urging force of the first torsion spring 28 and the urging force of the second torsion spring 30.

According to this structure, the rigidity and accuracy (that is, straightness) of the shaft 18 can be ensured as compared with the case where the entire shaft 18 is made of a resin material. Moreover, when the holder portion 182 is made of the resin, it is possible to realize the shaft 18 that is lightweight and has a complex shape. In particular, by ensuring the straightness of the shaft 18, a clearance of, for example, the bearing 124g can be reduced. Therefore, a positional deviation of the shaft 18 in the radial direction can be limited.

(6) The shaft 18 extends through the stationary disk 14 and the drive disk 22 and is rotatably supported by the housing 12. By adopting the structure in which the shaft 18 extends through the stationary disk 14 and the drive disk 22, the stationary disk 14 and the drive disk 22 can be centered by the shaft 18. As a result, the positional deviation of the stationary disk 14 and the drive disk 22 in the radial direction (that is, the radial direction DRr) can be limited. This is effective for limiting the variations in the opening degree of the respective flow passage holes 141, 142.

(7) The housing 12 has the mounting portion 122a that contacts the back surface of the stationary disk 14 which is opposite to the opening surface 140 of the stationary disk 14 placed in contact with the sliding surface 220. The gasket 15 is placed between the stationary disk 14 and the mounting portion 122a and is configured to seal the gap between the stationary disk 14 and the mounting portion 122a.

According to this, leakage of the fluid from the gap between the stationary disk 14 and the mounting portion 122a can be limited.

OTHER EMBODIMENTS

Although the representative embodiment of the present disclosure has been described above, the present disclosure is not limited to the above-described embodiment and can be variously modified, for example, as follows.

Although the components of the valve device 10 have been described in detail in the above embodiment, the components are not limited to those described above and may differ from those described above.

In the above-described embodiment, there is described the example, in which the distance of each contact surface 187a, 188a from the central axis CL of the shaft 18 falls in the intermediate range that is from the radius Rc of the compression spring 26 to the outer radius Rd of the drive disk 22. However, the valve device 10 of the present disclosure is not limited to this configuration. In the valve device 10, for example, the distance of each contact surface 187a, 188a from the central axis CL of the shaft 18 may be outside of the intermediate range MR described above.

In the above-described embodiment, there is described the example, in which each of the first contact surface 187a and the second contact surface 188a has the segment, the distance of which from the central axis CL of the shaft 18 is equally set at each of the first contact surface 187a and the second contact surface 188a. However, the configuration of the respective contact surfaces 187a, 188a is not limited to this configuration. The contact surfaces 187a, 188a may have different distances from the central axis CL of the shaft 18.

As described in the above embodiment, it is desirable that in the valve device 10, the lever 24 includes the engaging portions which are configured to engage with the shaft 18 in the state where the second torsion spring 30 is interposed between the lever 24 and the shaft 18. However, these engaging portions may be eliminated.

In the above-described embodiment, the shaft 18 and the lever 24 are configured to contact at the two different locations which are displaced from each other in the circumferential direction DRc. However, the valve device 10 of the present disclosure is not limited to this. In the valve device 10, for example, the shaft 18 and the lever 24 may contact with each other at three or more different locations which are displaced from each other in the circumferential direction DRc.

As described in the above embodiment, it is desirable that the shaft 18 includes the central axis portion 181 made of the metal and the holder portion 182 made of the resin. However, the present disclosure is not limited to this. For example, the shaft 18 may be formed such that the central axis portion 181 and the holder portion 182 are made of one of the metal material and the resin material.

In the above-described embodiment, there is exemplified that the two end portions of the shaft 18 are rotatably supported by the housing 12. However, the valve device 10 is not limited to this. In the valve device 10, for example, one end portion of the shaft 18 may be rotatably supported by the stationary disk 14. Furthermore, in the valve device 10, for example, only one of the two end portions of the shaft 18 may be rotatably supported by the housing 12.

In the above-described embodiment, the compression spring 26 urges the rotor 20 against the stationary disk 14. However, the valve device 10 of the present disclosure is not limited to this configuration. The valve device 10 may be configured such that, for example, an elastomer, which is shaped in a cylindrical tubular form and is resiliently deformable in the axial direction DRa of the shaft 18, may be used to urge the rotor 20 against the stationary disk 14. Furthermore, the valve device 10 may be configured such that a pressure difference between the inlet-side space 12d and the outlet-side space 12e is used to urge the rotor 20 against the stationary disk 14. As indicated above, the compression spring 26 is not an essential component in the valve device 10.

In the above-described embodiment, the first torsion spring 28 urges the shaft 18 relative to the housing 12. However, the first torsion spring 28 is not an essential component and may be eliminated.

In the above-described embodiment, there is exemplified that the valve device 10 is formed as the three-way valve. However, the valve device 10 is not limited to the three-way valve. The valve device 10 of the present disclosure may be configured as, for example, a flow rate adjusting valve or an on-off valve which has one fluid inlet and one fluid outlet. In this case, one flow passage hole is formed at the stationary disk 14. The valve device 10 of the present disclosure may be, for example: a multi-way valve having one fluid inlet and three or more fluid outlets; a multi-way valve having three or more fluid inlets and one fluid outlet; or a multi-way valve having a plurality of fluid inlets and a plurality of fluid outlets.

In the above-described embodiment, there is described the example where the valve device 10 of the present disclosure is applied as the control valve for the vehicle. However, the valve device 10 of the present disclosure may be applied as a control valve for other machines that is other than the vehicle.

Needless to say, in the above-described embodiments, the components of the embodiment(s) are not necessarily essential except when it is clearly indicated that they are essential and when they are clearly considered to be essential in principle.

In the above-described embodiments, when the numerical values, such as the number, numerical value, quantity, range, etc. of the components of the embodiment(s) are mentioned, the numerical values are not limited to those described in the embodiment(s) except when it is clearly indicated that the numeric values are essential and when the numeric values are clearly considered to be essential in principle.

In the above-described embodiments, when a shape, a positional relationship, etc. of the component(s) is mentioned, the shape, positional relationship, etc. are not limited to those described in the embodiment(s) unless otherwise specified or limited in principle to the those described in the embodiment(s).

What is claimed is:

1. A valve device comprising:
a housing that forms a fluid passage at an inside of the housing, wherein the fluid passage is configured to conduct fluid through the housing;
a stationary disk that is shaped in a plate form and is fixed at the inside of the housing, wherein the stationary disk has at least one flow passage hole which is configured to conduct the fluid through the stationary disk;
a drive device that is configured to output a rotational force;
a shaft that is configured to be rotated about a central axis, which is predetermined, by the rotational force; and
a rotor that is configured to increase or decrease an opening degree of the at least one flow passage hole in response to rotation of the shaft, wherein:
the rotor includes:
a drive disk that is shaped in a plate form and is configured to slide relative to the stationary disk; and
a lever that is fixed to the drive disk and couples between the drive disk and the shaft to enable integral rotation of the drive disk and the shaft in a state where the drive disk is displaceable in an axial direction of the shaft;
a torsion spring is placed between the shaft and the lever and is configured to urge the lever relative to the shaft in a circumferential direction around the central axis of the shaft; and
the shaft has a plurality of contact portions that are configured to contact the lever and are respectively located at a plurality of locations which are displaced from each other in the circumferential direction.

2. The valve device according to claim 1, comprising a compression spring that is configured to urge the rotor against the stationary disk, wherein:
the compression spring is arranged to surround the central axis of the shaft; and
a distance of each of the plurality of contact portions from the central axis of the shaft is in an intermediate range that is from a radius of the compression spring to an outer radius of the drive disk, wherein the outer radius of the drive disk corresponds to a distance which is measured from the central axis to an outer periphery of the drive disk and is largest at the drive disk.

3. The valve device according to claim 1, wherein each of the plurality of contact portions extends in a direction away from the central axis of the shaft and has a segment, a distance of which from the central axis is equally set at each of the plurality of contact portions.

4. The valve device according to claim 1, wherein the lever has a plurality of engaging portions, each of which is configured to engage with a corresponding one of the plurality of contact portions in a state where the torsion spring is interposed between the lever and the shaft.

* * * * *